US012326794B2

(12) United States Patent
Smith et al.

(10) Patent No.: US 12,326,794 B2
(45) Date of Patent: Jun. 10, 2025

(54) PRODUCT USE AND BEHAVIOR MONITORING INSTRUMENT

(71) Applicant: RAI STRATEGIC HOLDINGS, INC., Winston-Salem, NC (US)

(72) Inventors: Jeffrey Sean Smith, Winston Salem, NC (US); Steven L. Alderman, Lewisville, NC (US); Paul A. Brinkley, Winston-Salem, NC (US); Sarah A. Baxter-Wright, Mooresville, NC (US); Kyung Soo (Jason) Hong, Clemmons, NC (US); Paul R. Nelson, Winston-Salem, NC (US); Stephen B. Sears, Siler City, NC (US); Rajesh Sur, Winston-Salem, NC (US); John Darnell, Winston-Salem, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 97 days.

(21) Appl. No.: 15/892,151

(22) Filed: Feb. 8, 2018

(65) Prior Publication Data

US 2019/0087302 A1 Mar. 21, 2019

Related U.S. Application Data

(63) Continuation-in-part of application No. 15/710,681, filed on Sep. 20, 2017, now Pat. No. 10,856,577.

(51) Int. Cl.
*A24F 40/51* (2020.01)
*A24F 40/485* (2020.01)
(Continued)

(52) U.S. Cl.
CPC ........ *G06F 11/3438* (2013.01); *A24F 40/485* (2020.01); *A24F 40/51* (2020.01);
(Continued)

(58) Field of Classification Search
None
See application file for complete search history.

(56) References Cited

U.S. PATENT DOCUMENTS 2,974,669 A 3/1961 Ellis
4,627,448 A 12/1986 Kamm et al.
(Continued)

FOREIGN PATENT DOCUMENTS

CA 2876267 A1 6/2015
CN 101988919 3/2011
(Continued)

OTHER PUBLICATIONS

International Search Report and Written Opinion from corresponding PCT Application No. PCT/US2018/051543, dated Dec. 20, 2018, pp. 1-22.

(Continued)

*Primary Examiner* — Katherine A Will
(74) *Attorney, Agent, or Firm* — BURR & FORMAN LLP

(57) ABSTRACT

A product use and behavior instrument includes a housing defining a central compartment therein. A controller is positioned within the central compartment. The controller includes a connector. The connector is configured to operatively and removably couple the product use and behavior instrument to an electronic smoking article. The electronic smoking article includes a heating element to heat a tobacco product. The electronic smoking article includes a battery. A sensor circuit is structured to collect at least one use data characteristic of a smoking action. The smoking action is associated with use of at least one of the heating element and battery. Local memory is structured to store the at least one use data characteristic of the smoking action. A communication interface is structured to communicate the stored at (Continued)

100
104
102
116
118
120
110
112
122
104 least one use data characteristic of the smoking action to a remote computing device.

35 Claims, 8 Drawing Sheets

(51) Int. Cl.
*A24F 40/53* (2020.01)
*A24F 40/65* (2020.01)
*G06F 11/30* (2006.01)
*G06F 11/34* (2006.01)
*A24F 40/10* (2020.01)
*A24F 40/20* (2020.01)

(52) U.S. Cl.
CPC .............. *A24F 40/53* (2020.01); *A24F 40/65* (2020.01); *G06F 11/3013* (2013.01); *G06F 11/3058* (2013.01); *A24F 40/10* (2020.01); *A24F 40/20* (2020.01)

(56) References Cited

U.S. PATENT DOCUMENTS 4,714,082 A 12/1987 Banerjee et al.
4,756,318 A 7/1988 Clearman et al.
4,771,795 A 9/1988 White et al.
4,793,365 A 12/1988 Sensabaugh et al.
4,917,128 A 4/1990 Clearman et al.
4,922,901 A 5/1990 Brooks et al.
4,961,438 A 10/1990 Korte
4,966,171 A 10/1990 Serrano et al.
4,969,476 A 11/1990 Bale et al.
4,991,606 A 2/1991 Serrano et al.
5,020,548 A 6/1991 Farrier et al.
5,033,483 A 7/1991 Clearman et al.
5,040,551 A 8/1991 Schlatter et al.
5,050,621 A 9/1991 Creighton et al.
5,060,671 A 10/1991 Counts et al.
5,065,776 A 11/1991 Lawson et al.
5,076,296 A 12/1991 Nystrom et al.
5,076,297 A 12/1991 Farrier et al.
5,099,861 A 3/1992 Clearman et al.
5,105,835 A 4/1992 Drewett et al.
5,105,837 A 4/1992 Barnes et al.
5,115,820 A 5/1992 Hauser et al.
5,148,821 A 9/1992 Best et al.
5,159,940 A 11/1992 Hayward et al.
5,178,167 A 1/1993 Riggs et al.
5,183,062 A 2/1993 Clearman et al.
5,211,684 A 5/1993 Shannon et al.
5,240,014 A 8/1993 Deevi et al.
5,240,016 A 8/1993 Nichols et al.
5,345,955 A 9/1994 Clearman et al.
5,388,594 A 2/1995 Counts et al.
5,551,451 A 9/1996 Riggs et al.
5,595,577 A 1/1997 Bensalem et al.
5,726,421 A * 3/1998 Fleischhauer ......... A24F 47/008 131/182
5,819,751 A 10/1998 Barnes et al.
6,089,857 A 7/2000 Matsuura et al.
6,095,152 A 8/2000 Beven et al.
6,578,584 B1 6/2003 Beven et al.
6,730,832 B1 5/2004 Dominguez
7,290,549 B2 11/2007 Banerjee et al.
7,481,226 B2 1/2009 Cholet
8,079,371 B2 12/2011 Robinson et al.
8,402,976 B2 3/2013 Fernando et al.
8,424,538 B2 4/2013 Thomas et al.
8,464,726 B2 6/2013 Sebastian et al.
8,469,035 B2 6/2013 Banerjee et al.
8,617,263 B2 12/2013 Banerjee et al.
8,851,081 B2 10/2014 Fernando et al.
9,016,274 B1 4/2015 White
9,078,474 B2 7/2015 Thompson
9,149,072 B2 10/2015 Conner et al.
9,214,268 B2 12/2015 Difonzo et al.
9,220,301 B2 12/2015 Banerjee et al.
9,301,546 B2 4/2016 Thomas et al.
9,332,784 B2 5/2016 Banerjee et al.
9,345,268 B2 5/2016 Stone et al.
9,439,453 B2 9/2016 Conner et al.
9,486,013 B2 11/2016 Sebastian et al.
9,788,571 B2 10/2017 Conner et al.
9,814,268 B2 11/2017 Robinson et al.
9,839,241 B2 12/2017 Davidson et al.
9,933,790 B2 4/2018 Blackley
2004/0031497 A1 2/2004 Likness et al.
2004/0177674 A1 9/2004 Read et al.
2008/0257368 A1 10/2008 Wilson et al.
2011/0265806 A1 11/2011 Alarcon et al.
2013/0220315 A1 8/2013 Conley et al.
2013/0255702 A1 10/2013 Griffith et al.
2013/0255703 A1 10/2013 Banerjee et al.
2013/0284192 A1 10/2013 Peleg et al.
2014/0000638 A1 1/2014 Sebastian et al.
2014/0060554 A1 3/2014 Collett et al.
2014/0096781 A1 4/2014 Sears et al.
2014/0096782 A1 4/2014 Ampolini et al.
2014/0278250 A1 9/2014 Smith et al.
2015/0053217 A1* 2/2015 Steingraber ............ A24F 40/60 131/329
2015/0059780 A1 3/2015 Davis et al.
2015/0102777 A1 4/2015 Cooper
2015/0122252 A1 5/2015 Frija
2015/0128966 A1 5/2015 Lord
2015/0157052 A1 6/2015 Ademe et al.
2015/0181945 A1 7/2015 Tremblay
2015/0196053 A1 7/2015 Liu
2015/0196057 A1 7/2015 Wu
2015/0224268 A1 8/2015 Henry et al.
2015/0245654 A1 9/2015 Memari et al.
2015/0335070 A1 11/2015 Sears et al.
2015/0359263 A1 12/2015 Bellinger
2016/0002484 A1 1/2016 Geisen et al.
2016/0029697 A1 2/2016 Shafer
2016/0157524 A1* 6/2016 Bowen ................. A24F 47/008 128/200.14
2016/0219938 A1 8/2016 Mamoun et al.
2016/0302484 A1 10/2016 Gupta et al.
2017/0000188 A1 1/2017 Nordskog et al.
2017/0055576 A1 3/2017 Beeson et al.
2017/0065000 A1 3/2017 Sears et al.
2017/0156399 A1* 6/2017 Freeman ................ A24F 40/60
2017/0164654 A1 6/2017 Ademe
2017/0238607 A1 8/2017 Nordskog
2017/0258136 A1 9/2017 Hawes et al.
2017/0340008 A1 11/2017 Sebastian et al.
2018/0213849 A1 8/2018 Qiu
2018/0289074 A1* 10/2018 Tremblay .............. A24F 47/008
2019/0087302 A1 3/2019 Smith et al.
2019/0255266 A1* 8/2019 Henry, Jr. ............ A24F 47/008

FOREIGN PATENT DOCUMENTS

CN 101795587 7/2012
CN 104783331 A 7/2015
CN 104812260 7/2015
CN 105307521 2/2016
CN 106490683 A 3/2017
ES 2316969 4/2009
FR 2879746 A1 6/2006
JP 2017513513 6/2017
KR 20100127817 A 12/2010
KR 20140118985 A 10/2014
KR 20160005373 A 1/2016
KR 1020160095694 8/2016
KR 20160145089 A 12/2016
KR 20170013401 A 2/2017
KR 20170095212 A 8/2017
KR 1020200127817 A 11/2020
WO WO-98/46093 A1 10/1998
WO WO-02/098245 A1 12/2002
WO 2015120124 A1 8/2015

(56) References Cited

FOREIGN PATENT DOCUMENTS

| | | | |
|---|---|---|---|
| WO | 2016019066 | A1 | 2/2016 |
| WO | 2016199065 | A1 | 12/2016 |
| WO | 2017023589 | | 2/2017 |
| WO | WO-2017/023589 | A1 | 2/2017 |
| WO | WO-2017/027673 | A1 | 2/2017 |

OTHER PUBLICATIONS

International Search Report and Written Opinion in PCT/US2019/050047, Dec. 12, 2019, 15 pages.
Non-Final Office Action in U.S. Appl. No. 16/131,785, Jul. 10, 2020, 12 pages.
International Search Report and Written Opinion of the ISA/EP in PCT/US2020/031329, Aug. 6, 2020, 14 pages.
Non-Final Office Action in U.S. Appl. No. 16/131,785, Dec. 9, 2020, 16 pages.
Chinese Office Action issued Dec. 5, 2022 in Chinese Patent Application No. 201880068356.5.
Australian Examination Report received Jun. 19, 2023 for Australian Patent Application No. 2018337727.
Second Examination Report issued in Australian Application No. 2018337727 on Jun. 13, 2024, all enclosed pages cited.
Office Action (with translation) issued in Korean Application No. 10-2020-7010838 on May 2, 2024, all enclosed pages cited.
Office Action (with translation) issued in Ukrainian Application No. a202002433 on Jun. 11, 2024, all enclosed pages cited.
Notice of Reasons for Rejection (with translation) issued in Japanese Application No. 2023-201400 on Dec. 3, 2024, all enclosed pages cited.
Office Action issued in Malaysian Application No. PI2020001474 on Nov. 25, 2024, all enclosed pages cited.
Office Action (with translation) issued in Korean Application No. 10-2024-7037222 on Dec. 1, 2024, all enclosed pages cited.
Notice of Allowance (no English Translation provided) issued in corresponding Israeli Patent Application No. 301903 mailed Mar. 3, 2025, all pages cited in its entirety.
Office Action issued in corresponding New Zealand Patent Application No. 763393 mailed Mar. 21, 2025, all pages cited in its entirety.
Office Action issued in corresponding Canadian Patent Application No. 3,224,785 mailed May 1, 2025, all pages cited in its entirety.

* cited by examiner

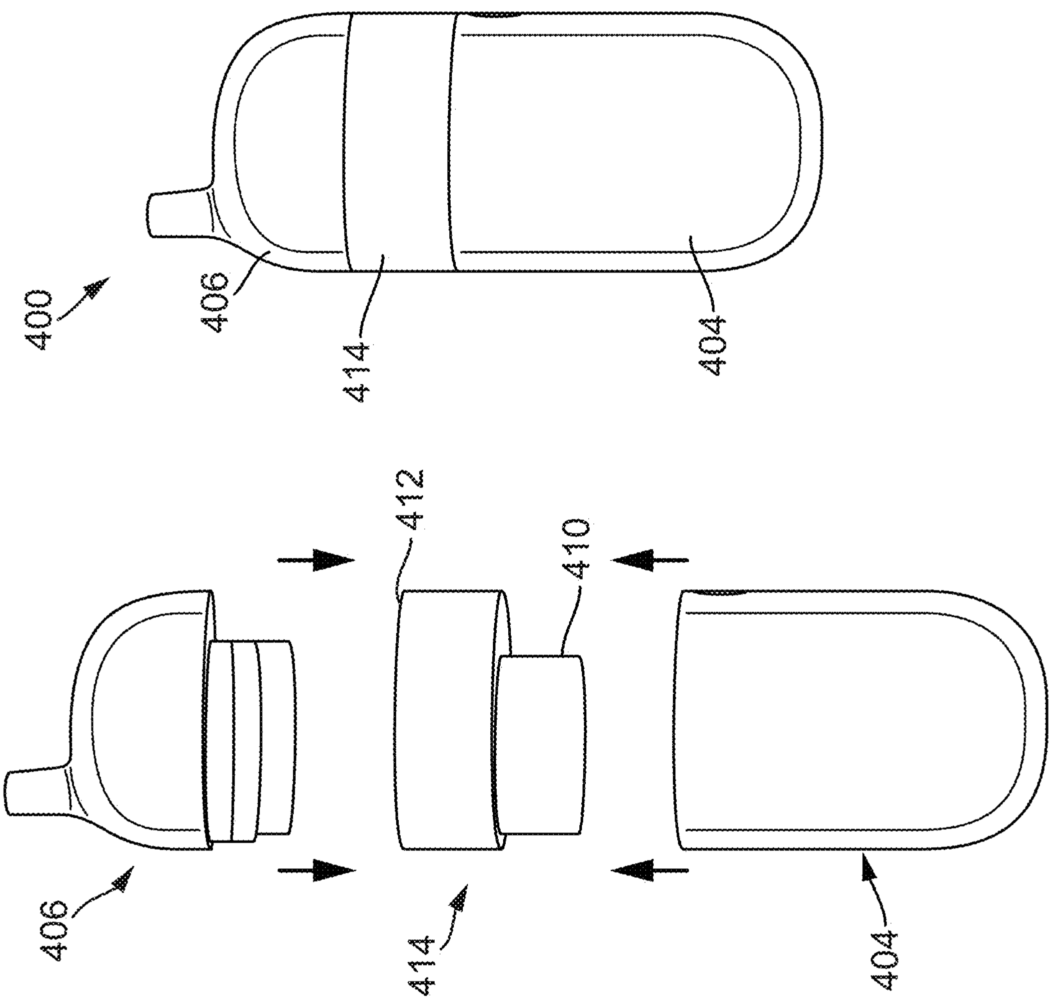
FIG. 4C
FIG. 4B
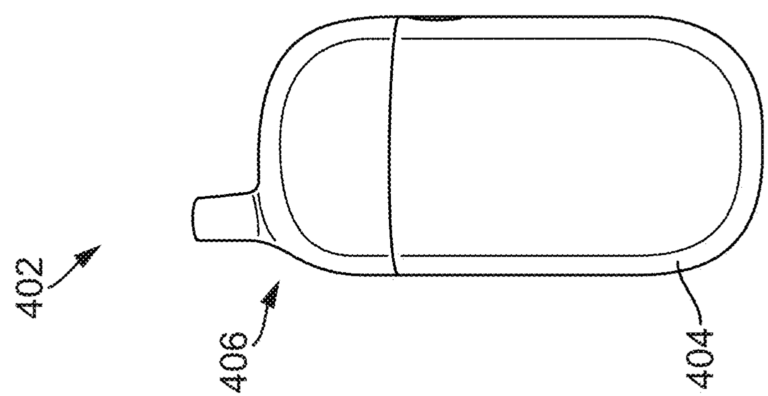
FIG. 4A

PRODUCT USE AND BEHAVIOR MONITORING INSTRUMENT

CROSS REFERENCE TO RELATED APPLICATION

This application is a continuation-in-part of U.S. patent application Ser. No. 15/710,681 entitled "PRODUCT USE AND BEHAVIOR MONITORING INSTRUMENT" filed Sep. 20, 2017, which is hereby incorporated by reference in its entirety.

TECHNICAL FIELD

The present invention relates to aerosol delivery articles and uses thereof for yielding tobacco components or other materials in an inhalable form. The articles may be made or derived from tobacco or otherwise incorporate tobacco for human consumption. More particularly, the present invention relates generally to the field of electronic or electrically powered smoking articles.

BACKGROUND

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree (e.g., "heat-not-burn" products). See, for example, the various alternative smoking articles, aerosol delivery devices and heat generating sources set forth in the background art described in U.S. Pat. App. Pub. No. 2013/0255702 to Griffith Jr. et al., U.S. Pat. App. Pub. No. 2014/0000638 to Sebastian et al., U.S. Pat. No. 5,060,671 to Counts et al.; U.S. Pat. No. 9,016,274 to White; U.S. Pat. No. 9,078,474 to Thompson; U.S. Pat. App. Pub. No. 2014/0060554 to Collett et al., U.S. Pat. App. Pub. No. 2014/0096781 to Sears et al., U.S. Pat. App. Pub. No. 2014/0096782 to Ampolini et al., and U.S. Pat. App. Pub. No. 2015/0059780 to Davis et al., which are incorporated herein by reference in their entireties. See also, for example, the various embodiments of products and heating configurations described in the background sections of U.S. Pat. No. 5,388,594 to Counts et al. and U.S. Pat. No. 8,079,371 to Robinson et. al, which are incorporated by reference in their entireties. See, for example, the various alternative smoking articles, aerosol delivery devices and heat-not-burn generating sources set forth in the background art described in U.S. Pat. App. Pub. No. 2015/0040930 to Robinson et. al. (U.S. Pat. No. 9,814,268), U.S. Pat. App. Pub. No. 2005/0016549 to Banerjee et. al., U.S. Pat. App. Pub. No. 2016/0073687 to Banerjee et. al. (U.S. Pat. No. 9,220,301), U.S. Pat. App. Pub. No. 2010/0065075 to Banerjee et. al. (U.S. Pat. No. 8,469,035), U.S. Pat. App. Pub. No. 2011/0180082 to Banerjee et. al et. al. (U.S. Pat. No. 8,617,263), U.S. Pat. App. Pub. No. 2011/0041861 to Sebastian et. al. (U.S. Pat. No. 8,464,726), U.S. Pat. App. Pub. No. 2013/0233329 to Sebastian et al. (U.S. Pat. No. 9,486,013), U.S. Pat. App. Pub. No. 2011/0271972 to Thomas et. al. (U.S. Pat. No. 8,424,538), U.S. Pat. App. Pub. No. 2012/0067360 to Conner et. al., U.S. Pat. App. Pub. No. 2013/0269720 to Stone et. al. (U.S. Pat. No. 9,345,268), U.S. Pat. App. Pub. No. 2015/0157052 to Ademe et. al., U.S. Pat. App. Pub. No. 2017/0000188 to Nordskog et. al., or U.S. Pat App Ser. No. 2017/0238607 to Nordskog et al.

Popular electronic or electrically powered smoking articles (e.g., electronic cigarettes, E-cigarettes, etc.) (referred to herein collectively as "electronic smoking articles") often include a liquid storage component for storing aerosol precursor material (e.g., aerosol forming agent, liquid smoke, etc.), a vaporizing chamber with a heating coil attached for the aerosol precursor material to become vaporized therein, and a battery to power the device. The aerosol precursor material typically includes a mixture of propylene glycol, glycerin, nicotine, water and flavoring. Various electronic smoking articles have a single device which houses both the heating element and the aerosol precursor material in one unit, commonly referred to as a cartomizer.

Certain tobacco products that have employed electrical energy to produce heat for smoke or aerosol formation, and in particular, certain products that have been referred to as electronic cigarette products or electronic smoking articles, have been commercially available throughout the world. Representative products that resemble many of the attributes of traditional types of cigarettes, cigars or pipes have been marketed as ACCORD® by Philip Morris Incorporated; ALPHA™, JOYE 510™ and M4™ by InnoVapor LLC; CIRRUS™ and FLING™ by White Cloud Cigarettes; COHITA™, COLIBRI™, ELITE CLASSIC™, MAGNUM™, PHANTOM™ and SENSE™ by Epuffer® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; GREEN SMOKE® by Green Smoke Inc. USA; GREENARETTE™ by Greenarette LLC; HALLIGAN™ HENDU™, JET™, MAXXQ™ PINK™ and PITBULL™ by Smoke Stik®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC and VUSE® by R. J. Reynolds Vapor Company. Yet other electrically powered aerosol delivery devices, and in particular those devices that have been characterized as so-called electronic cigarettes, have been marketed under the tradenames BLU™; COOLER VISIONS™; DIRECT E-CIG™; DRAGONFLY™; EMIST™; EVERSMOKE™; GAMUCCI®; HYBRID FLAME™; KNIGHT STICKS™; ROYAL BLUES™; SMOKETIP® and SOUTH BEACH SMOKE™. In some of these electronic smoking articles, when the user inhales on the electronic smoking article, aerosol precursor material is 'pulled' from the reservoir into a vaporizing chamber using gravity and capillary in the wick. The aerosol precursor material is either adsorbed or resting on the vaporizer's heating apparatus and heated until it becomes vapor. The vapor is drawn away from the heated region of the device, where it subsequently cools and condenses into a high number density, generally sub-micron aerosol whereupon it then exits the device. The wick material can include any combination of silica, organic cotton, cellucotton rayon fibers, stainless steel, fiberglass, ceramic, and other materials with similar properties.

Currently, there are limited options for recording and understanding how individuals use electronic smoking articles. For example, in clinical trials, most attempts have tried to adapt technology used to measure combustible cigarette use (e.g., topography), use video recording of people using an electronic smoking article, or question individual users to recall how they used the electronic smoking article. These methods are limiting by constraining the individual user being monitored to a single location. Therefore, the recording and documentation of the usage occurs in "unrealistic" circumstances. In other words, the act of measuring usage impairs how the person uses the electronic smoking article by limiting the individual user to a specific testing location, and not under regular, day-to-day locations and usage. Further, what "traditional" (e.g., under current monitoring methods) topography actually measures does not directly relate to what occurs when people use electronic smoking articles. Traditional topography with electronic smoking articles focus on air volume and pressure created in the act of taking a puff. The instrumentation is built around pressure transducers and analog-to-digital converters that will translate puff pressure dynamics to collect and compute per-puff and per-cigarette summaries of puffing characteristics. The placement of the topography instrument is placed in between the electronic smoking article and the user. This placement changes how the user uses the product as compared to how they use it naturally. This interference might change the way users use the product during testing and not provide information that accurately represents how the user consumes the product in the real world. Also, using traditional topography the consumer/subject must sit, tethered to the traditional topography instrument in a laboratory environment, further impacting product use and behavior. Accordingly, it would be desirable to provide a device that can be retrofitted onto a variety of electronic smoking articles and can monitor and capture usage of an individual user and the electronic smoking article under normal conditions (e.g., usage by an individual on a day-to-day basis absent monitoring).

SUMMARY

Various example embodiments relate to a product use and behavior instrument and methods of using of such an instrument. According to a first set of embodiments, a product use and behavior instrument includes a housing defining a central compartment therein. A controller is positioned within the central compartment. The controller includes a connector. The connector is configured to operatively and removably couple the product use and behavior instrument to an electronic smoking article. The electronic smoking article includes a heating element to heat a tobacco product. The electronic smoking article includes a battery. A sensor circuit is structured to collect at least one use data characteristic of a smoking action. The smoking action is associated with use of at least one of the heating element and battery. Local memory is structured to store the at least one use data characteristic of the smoking action. A communication interface is structured to communicate the stored at least one use data characteristic of the smoking action to a remote computing device.

According to a second set of embodiments, an electronic smoking article is described. The electronic smoking article includes a heating element configured to heat a tobacco product. The electronic smoking article further includes a battery. The electronic smoking article further includes a product use and behavior instrument. The product use and behavior instrument includes a controller. The controller includes a connector. The connector is configured to operatively and removably couple the product use and behavior instrument to the electronic smoking article. A sensor circuit is structured to collect at least one use data characteristic of a smoking action. The smoking action is associated with use of at least one of the heating element and battery. Local memory is structured to store the at least one use data characteristic of the smoking action. A communication interface is structured to communicate the stored at least one use data characteristic of the smoking action to a remote computing device.

In another set of embodiments, a method of capturing at least one use data characteristic of a smoking action is described. The method comprises providing an electronic smoking article to a user. The electronic smoking article includes a heating element configured to heat a tobacco product. The electronic smoking article further includes a battery. The electronic smoking article further includes a product use and behavior instrument. The product use and behavior instrument includes a controller. The controller includes a connector. The connector is configured to operatively and removably couple the product use and behavior instrument to the electronic smoking article. A sensor circuit is structured to collect at least one use data characteristic of a smoking action. The smoking action is associated with use of at least one of the heating element and battery. Local memory is structured to store the at least one use data characteristic of the smoking action. A communication interface is structured to communicate the stored at least one use data characteristic of the smoking action to a remote computing device. The controller activates the sensor circuit in response to initiation of the smoking action. At least one use data characteristic of the smoking action is captured by the sensor circuit. The at least one use data characteristic of the smoking action is stored in the local memory.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings. Exemplary embodiments of the present application will now be described, way of example only, with reference to the accompanying drawings, which are not necessarily drawn to scale, and wherein:

FIG. 4A is a perspective view of an assembled electronic smoking article, according to another example embodiment.

FIG. 4B is a perspective view of an unassembled product use and behavior monitoring instrument and electronic smoking article of FIG. 4A, according to a further example embodiment.

FIG. 4C is a perspective view of the assembled electronic smoking article with a product use and behavior monitoring instrument of FIG. 4B.

Figure 1:
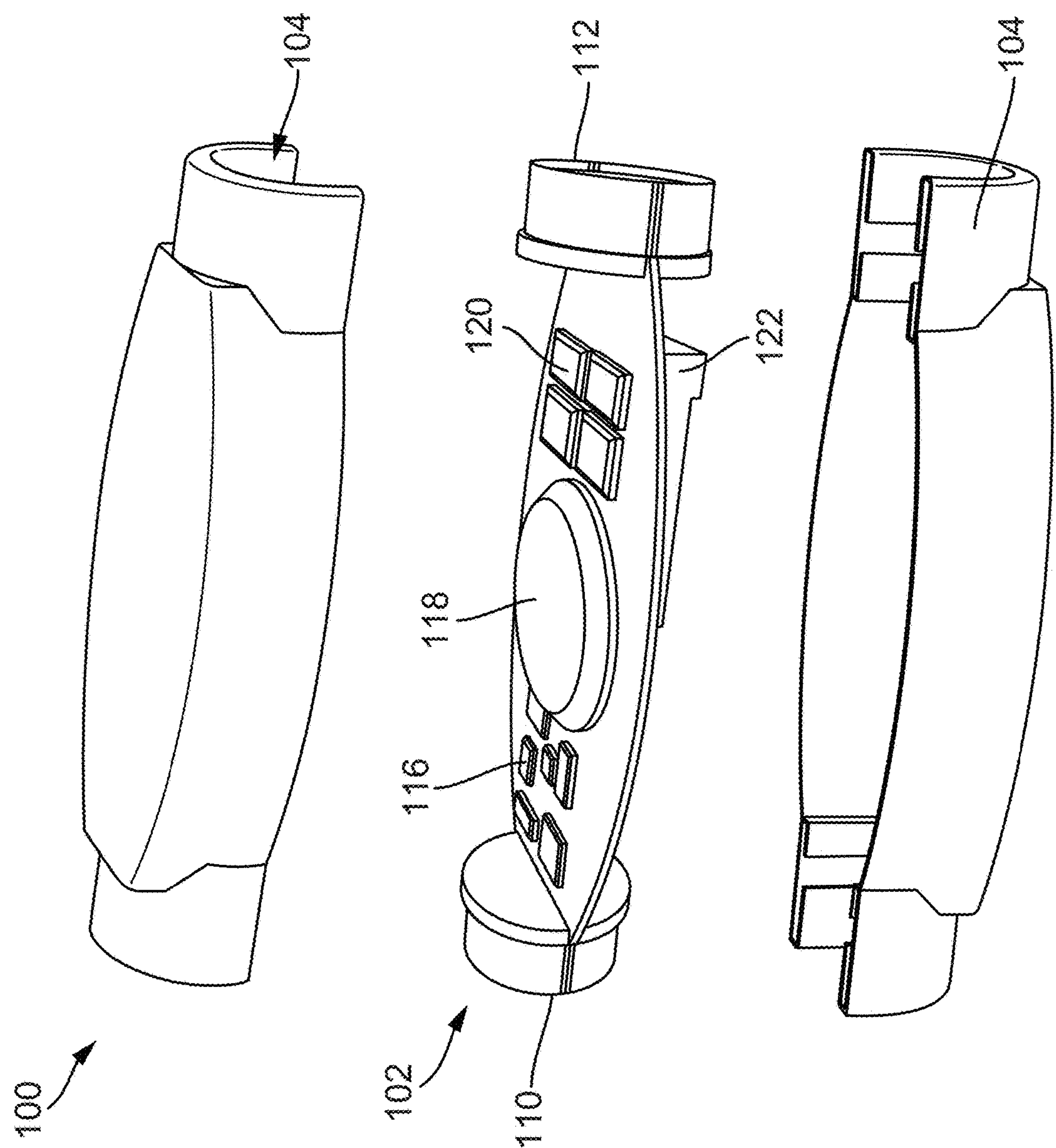
FIG. 1 is a perspective view of an unassembled product use and behavior monitoring instrument, according to an example embodiment.

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will be thorough and complete, will fully convey the scope of the disclosure to those skilled in the art, and will satisfy applicable legal requirements. Like numbers refer to like elements throughout. As used in this specification and the claims, the singular forms “a,” “an,” and “the” include plural referents unless the context clearly dictates otherwise.

DETAILED DESCRIPTION

Referring to the figures generally, a product use and behavior (“PUB”) instrument is described. The PUB instrument is structured to record various aspects of electronic smoking article use including usage by a user of the electronic smoking article and how the electronic smoking article responds to that use. The PUB instrument may also be tailored to monitor a tobacco heating system (“THS”) electronic smoking article that utilizes a “heat-not-burn” configuration that heats tobacco to a lower temperature than when a conventional smoking article is burned or in a manner different than heating a liquid as in conventional electronic smoking articles. As will be appreciated, the PUB instrument and the PUB for tobacco heating system (PUB-THS) instrument are similar in the data collected and general configuration, such that the features described in relation to the PUB instrument may be implemented with the PUB-THS instrument and vice versa. Thus, embodiments and disclosures referenced in relation to the PUB instrument may be applied to the PUB-THS instrument and embodiments and disclosures referenced in relation to the PUB-THS instrument may be applied to the PUB instrument unless explicitly noted otherwise. Accordingly, reference to a PUB instrument includes both the PUB instrument and the PUB-THS instrument.

As used herein, the heating of an inhalable substance includes electronic smoking articles that vaporize a liquid, electronic smoking articles that use a heating element that heats a porous substrate tobacco, electronic smoking articles that utilize precursor constituents in tobacco substrates, electronic smoking articles that make use of a precursor that is heated to form an aerosol that then passes through a porous tobacco substrate, medical devices that may heat a medicament—the medicament may be heated through use of any of the device arrangements described herein—in liquid and/or solid form so as to form an aerosol, and any combination thereof. In arrangements that utilize a porous substrate tobacco, the porous tobacco substrate may include packed beds of particles of wide variety of geometries, such as may be formed from ground, milled, or powdered tobacco lamina; tobacco monoliths containing air passageways; stacked (or bunched) layers of tobacco sheets; and/or other forms of tobacco and/or reconstituted tobacco. Example arrangements using tobacco substrate heated by aerosolized liquid to which various embodiments may be applied include the background art cited in U.S. Pat. App. Pub. No. 2015/0335070 and U.S. Pat. App. Pub. No. 2017/0065000, which are incorporated herein by reference in their entireties. In some arrangements that utilize a precursor, the porous tobacco substrate is heated by the passing aerosol, but is not directly heated by a heating element. The precursor may or may not include nicotine and/or other tobacco derivatives. Additionally, any of the described electronic smoking articles may be configured in a "dual heating" arrangement. In those arrangements, the electronic smoking article includes a vapor precursor (e.g., liquid) that is heated by a first heating element and a porous tobacco substrate downstream of the precursor that is heated by a second heating element. As will be appreciated, the heated vapor passes through/over the heated porous tobacco substrate. Consequently, the porous tobacco substrate (e.g., shreds, spheres, granules, etc.) is heated by the second heating element and by the vapor passing through/over it. Additionally, aerosol precursor may be implemented in either or both of the packed bed of tobacco chamber and the atomizing chamber. Further, the above described electronic smoking articles may be configured to have dual- and/or multi-heating elements.

Expanding upon arrangements that utilize precursor constituents in tobacco substrates, in some embodiments, a combustible heat source, such as a carbon heat source, may be used in addition to or in lieu of an electric heater. The combustible heat source may be positioned at the front (e.g., non-mouth) end of the product so as to provide heat to a packed bed of tobacco downstream. In those arrangements, air is drawn through the combustible heat source, heated, and transported through a tobacco bed containing aerosol precursor. The hot air heats the tobacco and precursor material and vaporizes the precursor and interacts with the tobacco substrate to produce a vapor that subsequently condenses to form an aerosol. Example arrangements using carbonaceous heat sources that various embodiments may be applied include the Premier™ electronic smoking article and the Eclipse™ electronic smoking article by the R.J. Reynolds Tobacco Company and arrangements described in "Chemical and Biological Studies on New Cigarette Prototypes that Heat Instead of Burn Tobacco, R.J. Reynolds Tobacco Company Monograph" (1988). Further example arrangements using combustible fuel sources to which various embodiments may be applied include the background art cited in U.S. Pat. No. 4,714,082 to Banerjee et al. and U.S. Pat. No. 4,771,795 to White et al.; which are incorporated herein by reference in their entireties. See, also, for example, those types of smoking articles described in U.S. Pat. No. 4,756,318 to Clearman et al.; U.S. Pat. No. 4,714,082 to Banerjee et al.; U.S. Pat. No. 4,771,795 to White et al.; U.S. Pat. No. 4,793,365 to Sensabaugh et al.; U.S. Pat. No. 4,917,128 to Clearman et al.; U.S. Pat. No. 4,961,438 to Korte; U.S. Pat. No. 4,966,171 to Serrano et al.; U.S. Pat. No. 4,969,476 to Bale et al.; U.S. Pat. No. 4,991,606 to Serrano et al.; U.S. Pat. No. 5,020,548 to Farrier et al.; U.S. Pat. No. 5,033,483 to Clearman et al.; U.S. Pat. No. 5,040,551 to Schlatter et al.; U.S. Pat. No. 5,050,621 to Creighton et al.; U.S. Pat. No. 5,065,776 to Lawson; U.S. Pat. No. 5,076,296 to Nystrom et al.; U.S. Pat. No. 5,076,297 to Farrier et al.; U.S. Pat. No. 5,099,861 to Clearman et al.; U.S. Pat. No. 5,105,835 to Drewett et al.; U.S. Pat. No. 5,105,837 to Barnes et al.; U.S. Pat. No. 5,115,820 to Hauser et al.; U.S. Pat. No. 5,148,821 to Best et al.; U.S. Pat. No. 5,159,940 to Hayward et al.; U.S. Pat. No. 5,178,167 to Riggs et al.; U.S. Pat. No. 5,183,062 to Clearman et al.; U.S. Pat. No. 5,211,684 to Shannon et al.; U.S. Pat. No. 5,240,014 to Deevi et al.; U.S. Pat. No. 5,240,016 to Nichols et al.; U.S. Pat. No. 5,345,955 to Clearman et al.; U.S. Pat. No. 5,551,451 to Riggs et al.; U.S. Pat. No. 5,595,577 to Bensalem et al.; U.S. Pat. No. 5,819,751 to Barnes et al.; U.S. Pat. No. 6,089,857 to Matsuura et al.; U.S. Pat. No. 6,095,152 to Beven et al; U.S. Pat. No. 6,578,584 Beven; and U.S. Pat. No. 6,730,832 to Dominguez.

As used herein, the heating of a tobacco product includes using heat with tobacco or a tobacco substrate, for example, as with electronic smoking articles that use a heating element that heats a porous substrate tobacco, electronic smoking articles that utilize precursor constituents in tobacco substrates, and electronic smoking articles that make use of a precursor that is heated to form an aerosol that then passes through a porous tobacco substrate, as described above. As will be appreciated, either the PUB instrument and PUB-THS instrument may be configured to engage, monitor, and record the wide variety of electronic smoking articles that heat an inhalable substance, including, for example medical devices that heat an inhalable medicament.

Generally, the PUB instrument can record and detect battery activation of the electronic smoking article, battery characteristics (e.g., wattage, voltage, and resistance), location (e.g., global position), orientation of instrument, movement of instrument, temperature of airflow entering electronic smoking article, and sound of airflow entering electronic smoking article. In regard to user usage, the PUB instrument can measure use characteristics, moment-to-moment and patterns over periods of time (e.g., hourly, daily, weekly), puff behaviors (e.g., number, duration, volume, inter-puff intervals, etc.), and changes in characteristic throughout a use session (e.g., smoking and non-smoking actions with the PUB instrument) or over periods of time. Beneficially, either PUB instrument is structured for retro-fitting onto a variety of electronic smoking articles, as it is adaptable to a wide variety of battery-tank, battery-tobacco stick, or battery cartridge connections of the electronic smoking article. As used herein, the term "tank" refers to some or all aerosol generating element of the electronic smoking article, including the cartridge, cartomizer, wicks, atomizers, heating elements, substrates, reservoirs, and similar elements. As used herein, the term "tobacco stick" refers to some or all of an aerosol generating element that includes some form of tobacco. The form of tobacco may include, for example tobacco impregnated with a mixture of tobacco and other elements, loose-leaf tobacco vaporizer that entails putting loose-leaf tobacco into a chamber (which is electrically heated using an element), or similar elements. In some embodiments, the electronic smoking article is a heatless delivery system that utilizes mechanical nebulization.

Generally, the PUB instrument includes an array of sensors to record product use characteristics, an on-board memory to store collected data, an on-board rechargeable power source, a wireless (e.g., Bluetooth™) communication array to transfer data to an external storage location, a first connector for a tank end, and a second connector for a battery end. Once a PUB instrument is installed on electronic smoking article, data monitoring and collection may be triggered or continuous by activation and deactivation of the electronic smoking article. At the completion of a segment of data acquisition, the PUB instrument may synchronize with a wireless communication-compatible computing device (e.g., desktop, laptop, tablet, smartphone, etc.) and upload the data to a secure database. Data may be exportable to any statistical software package for further analysis or to task specific summarization software. As will be appreciated, the PUB instrument may be utilized for clinical and non-clinical research to capture and track use of an electronic smoking article use data for behavioral modelling, to track use, and to provide information about use patterns.

Unlike traditional clinical techniques (e.g., topography), the PUB instrument does not primarily use air movement to generate the values associated with puff dynamics due to the nature of the differences between combustible and electronic smoking article. Additionally, the PUB instrument does not interfere with the pathway between the user (or clinical trial subject) and the product and does not interfere with the normal functioning of the product and the experience the user has while using the electronic smoking article. Finally, the PUB device is completely portable and allows for the user to use the electronic smoking article in a clinic, laboratory, or ambulatory (anywhere outside of the clinic or laboratory) environment. This increases the likelihood that what the instrument records will be aligned with actual electronic smoking article use characteristics.

Referring to FIG. 1, a perspective view of an unassembled PUB instrument 100 is shown, according to an example embodiment. The PUB instrument 100 includes a controller 102 and a housing 104. In certain embodiments, the housing 104 includes a first outer shroud and a second outer shroud. The PUB instrument 100 monitors, records, and transmits a plurality of user usage data and electronic smoking article device data. The PUB instrument 100 is structured to have a form, size, and connectors that allow it to be adapted to interface with-without interfering with the operation of—a wide variety of electronic smoking articles (e.g., e-cigarette, pen, open and/or closed system "tank" product designs). As will be appreciated, the PUB instrument 100 is durable and may be used in both controlled and limited control environments, under supervision and unsupervised, and in accordance with product safety standards for mobile research equipment.

The controller 102 includes a first end connector 110, a second end connector 112, a sensor array 116, a PUB battery 118, on-board memory 120, and an antenna 122. The controller 102 is structured to monitor, record, and store a plurality of data and characteristics of the user and electronic smoking article. The controller 102 is structured to have a size and connectors that will interface with a wide variety of electronic smoking article and interfere as little as physically possible with the intended form of an electronic smoking article. The controller 102 acquires real-time data related to characteristics of individual puff behaviors (e.g., number, duration, volume, inter-puff intervals), change in puff characteristics from moment to moment, change in puff characteristics over an interval of time, and similar information. For example, captured puffing characteristics could include, but is not limited to, puff volume (ml), puff duration (s), number of puffs, number of sub-puffs, mean and peak flow (ml/s), mean and peak draft (ml/s), mean and peak resistance, mean and peak pressure drop (mmWg), inter puff interval (s), and time lit (s). The controller 102 may also record battery characteristics (e.g., wattage, voltage, and resistance), location, orientation of instrument, movement of instrument, temperature of airflow entering the electronic smoking article, and sound of airflow entering electronic smoking article. The controller 102 facilitates the storage of the data characteristics relating to moment-to-moment user use behaviors and patterns of usage across bouts of product interaction (e.g., hourly, daily, weekly). The controller 102, and associated elements, can be physically implemented on a circuit board.

The first end connector 110 includes a coupling element structured to removably couple to and interface with a battery end of an electronic smoking article. The electronic smoking article can be in a wide variety of different "forms," for example, a box style, a pen style, or an open system "tank" style product design. Each variety of an electronic smoking article can have different coupling mechanisms for attaching the battery to the tank. In some embodiments, one or more PUB instruments 100 (e.g., modules) may be used in a single electronic smoking article. In those embodiments, the first end connector 110 may be structured to couple with another module PUB instrument 100. As will be appreciated, the size and type of coupling element of the first end connector 110 is dependent upon the components that comprise the interior of a specific electronic smoking article. Exemplary connections are described below, in greater detail, in FIGS. 2A-4C.

The second end connector 112 includes a coupling element structured to removably couple to and interface with a tank (e.g., reservoir of smoking material) end of an electronic smoking article. An electronic smoking article can be in a wide variety of different "forms," for example, an electronic-cigarette, a pen, an open system "tank" product designs. Each variety of an electronic smoking article can have different coupling mechanisms for attaching the rechargeable battery to the tank. In some embodiments, one or more PUB instruments 100 (e.g., modules) may be used in a single electronic smoking article. In those embodiments, the second end connector 112 may be structured to couple with another PUB instrument 100. As will be appreciated, the size and type of coupling element of the second end connector 112 is dependent upon the components that comprise the interior of a specific electronic smoking article. The different connections are described below, in greater detail, in FIGS. 2A-4C.

The on-board memory 120 is structured to store data and characteristics collected by the sensor array 116. The on-board memory 120 may, for example, be flash memory or electrically erasable programmable read-only memory ('EEPROM") memory. The on-board memory 120 should provide sufficient memory capacity to allow storage of the highest estimated data load generated over a set period, for example, a seven-day period. In some embodiments, the on-board memory 120 may be reset to null values and the on-board clock resynced once data is uploaded. In other embodiments, the on-board memory 120 is structured to maintain all data until the on-board memory 120 reaches capacity. The on-board memory 120 may store data in raw data format, time and date stamp it, and use it to determine wattage values. As will be appreciated, the wattage values coupled with puff duration values may be used to generate a Total Particulate Matter ("TPM") constant for the estimated mouth-level exposure ("eMLE") of the aerosol measure. The data captured by the sensor array 116 is stored in the on-board memory 120 in both discrete individual data points and as part of a time and date-stamped cumulative record.

The PUB battery 118 includes an on-board, rechargeable battery. The PUB battery 118 may also be a rechargeable solid-state battery. The PUB battery 118 powers the PUB instrument 100 and is structured to ensure that performance of data collection by the PUB instrument 100 will not affect the performance of the battery. The PUB battery 118 should be able to maintain a charge throughout the highest estimated level of subject use. In some embodiments, the PUB battery 118 will last for at least seven days without having to be re-charged. In some embodiments, the PUB battery 118 is recharged when the electronic smoking article battery is recharged. In other embodiments, the PUB instrument 100 includes a charging port on the housing 104 that can charge the PUB battery 118. In some embodiments, the PUB instrument 100 does not have a PUB battery 118; instead the PUB instrument 100 draws power from the battery of the electronic smoking article.

The antenna 122 is structured to transmit collected by the sensor array 116 and stored by the on-board memory 120. The antenna 122 may be structured to upload data during the charging cycle of the electronic smoking article, during activation of the electronic smoking article device, continuously throughout the lifecycle of the electronic smoking article, or similar triggering events. In some embodiments, on-board memory 120 may be reset to null values and the on-board clock resynced once the data upload by the antenna 122 concludes. In some embodiments, the PUB instrument 100 uses Bluetooth™ or other wireless communication technology to facilitate the transfer of data from the memory of the PUB instrument 100 to a secured location (e.g., a server location) through data transfer software (e.g., PC, iOS™, or Android™). With the wireless transmission of the data over Bluetooth,™ the antenna 122 is designed to limit interference with the aerosol generated as much as possible. In other embodiments, the antenna 122 has a wired interface that allows for a wired connection to the secured location through the data transfer software. Data security and integrity during migration from the antenna 122 of the PUB instrument 100 to the computer or smart device, to the database server may be maintained according to appropriate research data standards. In some embodiments, the data hosted in the secure database may be used to communicate with the PC and/or Smart Device (e.g., Smartphone and/or Tablet) to present additional information to the user of the PUB instrument 100.

The sensor array 116 is structured to monitor and record one or more data characteristics of the electronic smoking article and the user usage data. The sensor array 116 is structured to monitor and record a wide variety of user usage characteristics and data. The sensor array 116 can capture real-time data related to characteristics of individual use behaviors (e.g., puff number, duration, volume, inter-puff intervals), how these characteristics change from moment to moment, and how battery characteristics, such as power (e.g., wattage), change moment to moment. The sensor array 116 may measure the time between when a puff is concluded (e.g., battery deactivation) and the initiation of the next puff (e.g., battery activation), also known as the inter-puff-interval ("IPI"). As will be appreciated, the puff statistics captured by the sensor array 116 can be used to capture puff, rapid-puffs, and sub-puff counts and duration values as well as IPI counts and duration values. In some embodiments, the sensor array 116 monitors and captures the activation of the battery—which aligns with the initiation of a puff—and measures the time that the battery is active to determine puff duration. In other embodiments, the sensor array 116 may record the conclusion of the puff when the battery is no longer active.

In regard to the electronic smoking article, the sensor array 116 may include specific sensors to detect battery activation of the electronic smoking article, battery characteristics (e.g., wattage, voltage, current, and resistance), or duration of battery use (e.g., length of smoke session). As will be appreciated, the data captured by the sensor array 116 is stored in the on-board memory 120 in both discrete individual data points and as part of a time and date-stamped cumulative record.

In some embodiments, the sensor array 116 includes hardware sensors that track the position of the electronic smoking article while being used. For example, a 9-axis gyroscope is used to capture the orientation of the PUB instrument 100, an accelerometer to capture the movement of the PUB instrument 100, a global position system ("GPS") or other satellite navigation systems (e.g., Galileo, GLONASS, BeiDou, etc.) to capture the location of the PUB instrument 100. In such embodiments, the position tracker(s) can be used to generate data concerning the location of the electronic smoking article in regards to the location relationship between the battery-end and the tank-end of the electronic smoking article. Beneficially, recording this location relationship allows for the researchers to determine how the user was holding the electronic smoking article while performing a puff. Determining if the user was holding the electronic smoking article while sitting in a manner similar to a traditional cigarette vs. smoking the electronic smoking article while lying on the couch with the battery above the tank provides more information regarding regular use of the electronic smoking article and can provide details toward tank leakage and mal-/miss-functioning of the electronic smoking article product.

The sensor array 116 may include hardware sensors that detect changes in the ambient temperature within airway ports of the electronic smoking article. The temperature changes may be used to identify when a puff is initiated and ongoing use of the electronic smoking article. In some embodiments, the PUB instrument 100 may include hardware sensors that detect the speed of movement of the PUB instrument 100 from one position to another. In those embodiments, linear acceleration of the PUB instrument 100 is measured in relation to use/non-use to identify the beginning of a period of product use. In other embodiments, the PUB instrument 100 may include hardware sensors that record the frequency of the sound of air passing through dedicated airway ports on the PUB instrument 100. In such embodiments, the use of passive acoustic measurements may provide information to understand puff velocity and the general shape of individual puff characteristics.

The PUB instrument 100 may also include hardware sensors that track and record events measured by other components that make up the PUB instrument 100. Beneficially, this tracking is date and time stamped such that all recorded events form a cumulative record. The cumulative record is trackable and exportable to any statistical software package for further analysis or to task specific summarization software. In other embodiments, the PUB instrument 100 may receive the externally processed cumulative record through a download to the PUB instrument 100. In such embodiments, the PUB instrument 100 may perform additional analysis or task specific summarization of the externally processed data. In other embodiments, the PUB instrument 100 performs information and feedback analysis of the cumulative record within the device. In other embodiments, the PUB instrument 100 may include a photo-, mechanical-, and/or pressure sensor that will detect if the PUB instrument 100 has been removed from the battery and/or tank end of the electronic smoking article.

In some embodiments, the PUB instrument 100 includes a toggle function on the controller 102. The toggle function can turn on, turn off, limit, or alter one or more data characteristics monitored and recorded by the PUB instrument 100. For example, the toggle function may limit the total puffs generated (e.g., in terms of duration, number, or a combination of both) over a specific period of time (e.g., minutes/hours/days/weeks, etc.) in order to limit the number of uses of the electronic smoking article. In other embodiments, the PUB instrument 100 includes a single activation button that can be used to trigger or mark events (e.g., date/time/location) that occur during the course of usage of the electronic smoking article. In some embodiments, the PUB instrument 100 includes a screen (e.g., LCD, LED, OLED, or other suitable screen) inserted on the housing 104.

The screen displays the status of any of the events that the PUB instrument 100 records or manages. The screen may also facilitate the user to adjust the data the sensor array monitors and records, for example through the toggle function. The user may use the screen to select an "off" option for one or more data characteristics collected, for example, location of the user throughout usage of the PUB instrument 100.

A PUB instrument 100 may also include an identifier related to the structure and characteristics of the PUB instrument 100. The identifier is updatable for each user throughout the use of the PUB instrument 100. As will be appreciated, this would allow a user to switch between a clinical (e.g., data captured for a third party's analysis) or non-clinical (e.g., data captured for the user's analysis) study. The identifier can be incorporated into the data set to allow for alignment of data type (e.g., clinical, non-clinical, specific user, PUB instrument 100 type) a data source. Additionally, the identifiers may be encoded into the PUB instrument 100 and visually apparent through an embossed portion of—or affixed by label to—the housing 104 of the PUB instrument 100. In some embodiments, the sensor array 116 may include an access control through a biometric security sensor such as, for example, a fingerprint sensor to detect fingerprint characteristics. In those embodiments, the use of the electronic smoking article and/or the data characteristic collection may only occur is the fingerprint sensor captures a fingerprint from an authorized user (e.g., associated with the PUB instrument). As will be appreciated, a biometric security sensor may be structured to capture a wide variety of biometric data (e.g., iris, voice, gait, etc.) from an authorized user.

In certain embodiments, the PUB instrument 100 is configured as a series of modules. A single module PUB instrument 100 may be located between the battery end and tank end of an electronic smoking article. A single module PUB instrument 100 may be structured to monitor and record a single or multiple data or characteristics. Multiple module PUB instruments 100 may be connected along the electronic smoking article to monitor and record a single or multiple data or characteristics. As will be appreciated, with module PUB instruments 100 an electronic smoking article can be tailored to capture a specific subset of data and characteristics. For example, a user may want to utilize the PUB instrument 100 to capture data characteristics, but not allow the transmission or capture of any location data. Therefore, the user's electronic smoking article could include module PUB instruments 100 that monitor and record data or characteristics unrelated to location. In some embodiments, the PUB instrument 100 includes a chip that is structured to interface on an electronic smoking article and collect least one use data characteristic.

As will be appreciated, data collected by the sensor array 116 can be input into a graphical-based software program for summary and pattern recognition of electronic smoking article use over specific periods of time. The software may import raw data exported from database on a per-user/per-trial basis. The data may be processed for summarizing and applying algorithms for computing discrete product use elements, product use rate and/or patterns, and the eMLE of the aerosol measure. Within the software program, information associated with the specific electronic smoking article under evaluation (e.g., TPM data values) needed to perform analytics are modifiable. Data generated by this process may be uploaded to the PUB instrument 100 database. As will be appreciated, data imported and results exported meet standards for data security and integrity. In other embodiments, the data collected by the sensor array 116 is sent to a task specific summarization software.

Figure 2C:
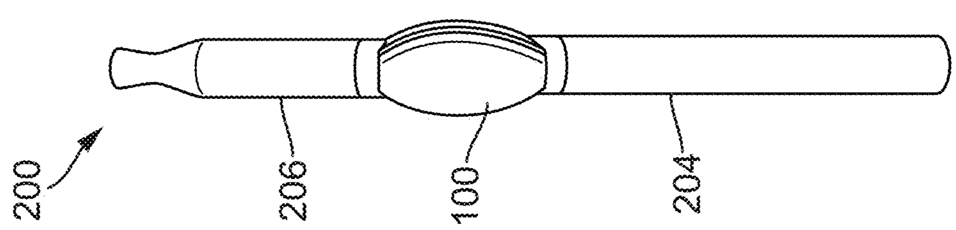
FIG. 2C is a perspective view of the assembled electronic smoking article with a product use and behavior monitoring instrument of FIG. 2B.
Figure 2B:
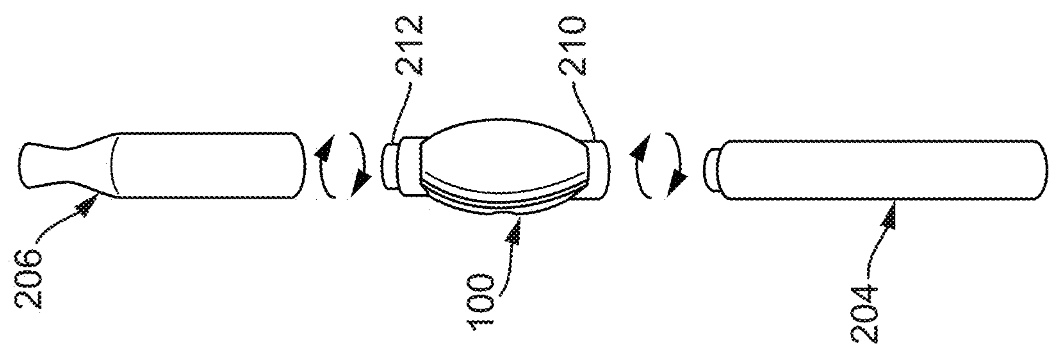
FIG. 2B is a perspective view of an unassembled product use and behavior monitoring instrument and electronic smoking article of FIG. 2A, according to a further example embodiment.
Figure 2A:
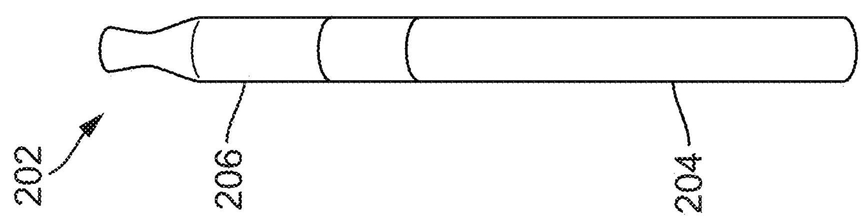
FIG. 2A is a perspective view of an assembled electronic smoking article, according to another example embodiment.

Referring to FIG. 2A, a perspective view of an assembled electronic smoking article 202 is shown, according to an example embodiment. The electronic smoking article 202 includes a battery 204 and a cylindrical reservoir 206 containing a liquid or other smoking material. The battery 204 is removably coupled to the reservoir 206 via complementary torsion (e.g., twist) interfaces on an end of the battery 204 and an end of the reservoir 206. As will be appreciated, a user of the electronic smoking article 202 can twist off the battery 204 from reservoir 206 to replace either component, to charge the battery 204, for maintenance purposes, or similar actions. In some embodiments, the electronic smoking article 202 has a light-emitting diode ("LED") indicator end on the battery 204. The LED indicator end will simulate a traditional cigarette lit end, indicating when the electronic smoking article is working. A mouth end on the reservoir 206 allows for the user to breathe into or draw from the electronic smoking article 202, drawing in air through the battery 204 into contact with the liquid in the reservoir 206 (e.g., indirectly), and, ultimately the mouth end to the user. In other embodiments, the air is drawn into a heating or vaporizing chamber, flowing over/around a heated wick that includes the liquid from the reservoir 206. The air entrains heated vapors from the wick and condenses into an aerosol that flows to the mouth end. In one embodiment, inhalation to draw in air starts the vaporization process. Alternatively, activation of a circuit closure (mechanical or optical) starts the vaporization process.

In contrast to more conventional cigarettes, the product generated by the electronic smoking article 202 is not a smoke, but rather an aerosol or a vapor resulting from the volatilization or vaporization of certain components incorporated therein. Inhalable substances can be found in both particulate and vapor fractions of the aerosol. A vapor is defined as a substance that resides in the gas phase at a temperature lower than its critical point. In electronic smoking articles, particulate matter consists of vapors that have condensed into tiny droplets. Both particles and vapors are suspended in the gases that comprise the indrawn air (largely oxygen and nitrogen). For purposes of simplicity, the term "vaporized liquid" as used herein is meant to include vapors, gases, and particles, i.e., aerosols of a form or type suitable for human inhalation, whether or not visible, and whether or not of a form that might be considered to be smoke-like.

The reservoir 206 contains a liquid that is vaporized and delivered to the user. In some embodiments, the liquid includes substances such as, for example nicotine, propylene glycol, glycerin, water, flavor agents, or any other suitable material that can be used to be vaporized. In particular embodiments, the liquid is a combination of nicotine, propylene glycol, and glycerin. Further, volatile organic compounds (VOCs) or tobacco alkaloids may be generated during the heating process. The reservoir is not limited to a particular size and can be opaque or transparent so that a user can view the liquid therein.

FIG. 2B illustrates a perspective view of an unassembled PUB instrument 100 and the electronic smoking article of FIG. 2A, according to an example embodiment. As shown in FIG. 2B, the PUB instrument 100 includes a first end connector 210 structured for torsional interface with the battery 204 end of the electronic smoking article 202. The PUB instrument further includes a second end connector 212 structured for torsional (e.g., twist) interface with the reservoir 206 end of the electronic smoking article 202. As will be appreciated, the PUB instrument 100 may include one or more of the components and sensor array 116 described above. While only one PUB instrument 100 is shown in FIG. 2B, in some embodiments, one or more PUB instruments 100 (e.g., modules) may be used in the electronic smoking article 202. In those embodiments, the first end connector 210, the second end connector 212, or both may be structured to couple with another PUB instrument 100. In some embodiments, the housing 104 of the PUB instrument 100 is altered to better fit the form of the electronic smoking article 202. As will be appreciated, the size and type of coupling element of the first end connector 110 is dependent upon the components that comprise the interior of the electronic smoking article 202.

Turning to FIG. 2C, a perspective view of the assembled electronic smoking article 202 with a PUB instrument 100 (the combination referred herein as the "PUB delivery system" 200) of FIG. 2B is shown, according to an example embodiment. The PUB delivery system 200 has the same general form and structure of the original electronic smoking article 202. The PUB instrument 100 has a size and form that is structured to minimally interfere physically with the intended form of the electronic smoking article 202. The components of the PUB instrument 100 ensure that the performance and use of the PUB delivery system 200 is substantially similar to the performance and use of the electronic smoking article 202.

Figure 3C:
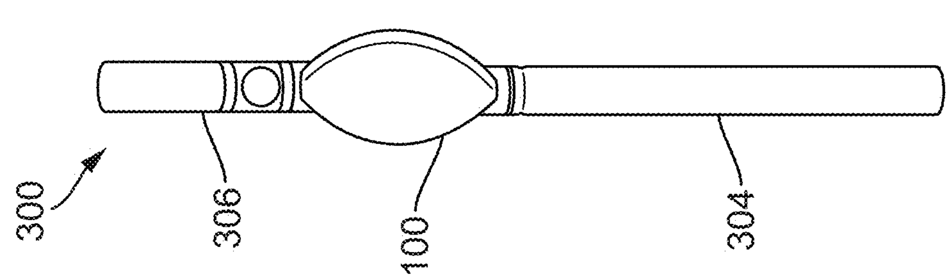
FIG. 3C is a perspective view of the assembled electronic smoking article with a product use and behavior monitoring instrument of FIG. 3B.
Figure 3B:
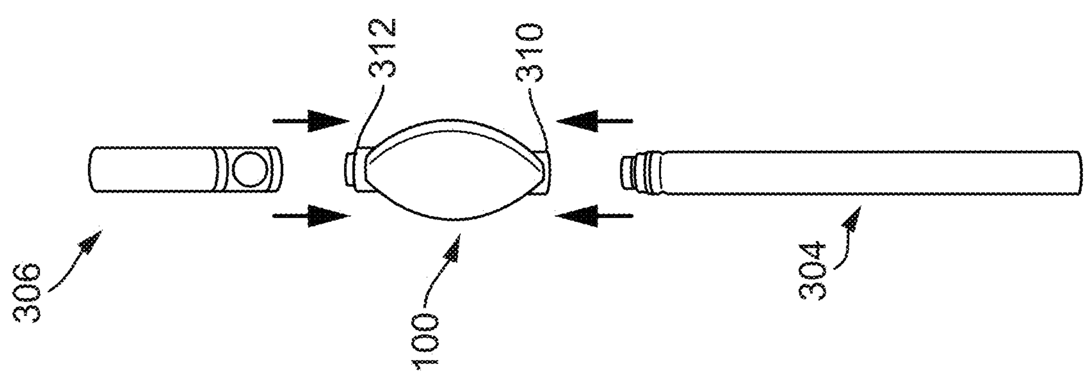
FIG. 3B is a perspective view of an unassembled product use and behavior monitoring instrument and electronic smoking article of FIG. 3A, according to yet another example embodiment.
Figure 3A:
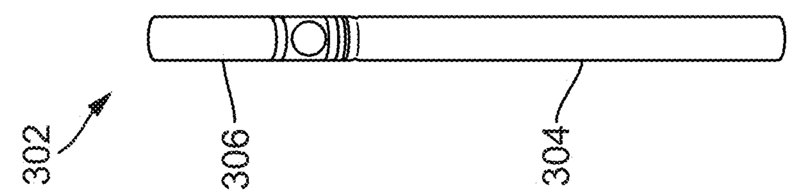
FIG. 3A is a perspective view of an assembled electronic smoking article, according to an example embodiment.

Referring to FIG. 3A, a perspective view of an assembled electronic smoking article 302 is shown, according to an example embodiment. The electronic smoking article 302 is similar to the electronic smoking article 202. A difference between the electronic smoking article 302 and the electronic smoking article 202 is the coupling interface between the battery 304 and the reservoir 306 of the electronic smoking article 302 is the interlocking interface. The electronic smoking article 302 includes a battery 304 and a cylindrical reservoir 306 containing a liquid or other smoking material. The battery 304 is removably coupled to the reservoir 306 via complementary interlocking (e.g., snap-fit) interfaces on an end of the battery 304 and an end of the reservoir 306. As will be appreciated, a user of the electronic smoking article 302 can be pushed to snap-fit the battery 304 to the reservoir 306 or pulled apart to replace either component, to charge the battery 304, for maintenance purposes, or similar actions. In some embodiments, the electronic smoking article 302 has an LED indicator end on the battery 304. The LED indicator end will simulate a traditional cigarette lit end, indicating when the electronic smoking article is working. A mouth end on the reservoir 306 allows for the user to breathe into the electronic smoking article 302, drawing in air through the battery 304 to the liquid in the reservoir 306, and, ultimately the mouth end to the user. In one embodiment, inhalation to draw in air starts the vaporization process. Alternatively, activation of a circuit closure (mechanical or optical) starts the vaporization process.

As noted previously, the byproduct generated by the electronic smoking article 302 is not a smoke, but rather an aerosol or a vapor resulting from the volatilization or vaporization of certain components incorporated therein. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). The reservoir 306 contains a liquid that is vaporized and delivered to the user.

FIG. 3B illustrates a perspective view of an unassembled PUB instrument 100 and the electronic smoking article of FIG. 3A is shown, according to an example embodiment. As shown in FIG. 3B, the PUB instrument 100 includes a first end connector 310 structured for interlocking interface with the battery end of the electronic smoking article 302. The PUB instrument further includes a second end connector 312 structured for interlocking interface with the reservoir end 306 of the electronic smoking article 302. As will be appreciated, the PUB instrument 100 may include one or more of the components and sensor array 116 described above. While only one PUB instrument 100 is shown in FIG. 3B, in some embodiments, one or more PUB instruments 100 (e.g., modules) may be used in the electronic smoking article 302. In those embodiments, the first end connector 310, the second end connector 312, or both may be structured to couple with another PUB instrument 100. In some embodiments, the housing 104 of the PUB instrument 100 is altered to better fit the form of the electronic smoking article 302. As will be appreciated, the size and type of coupling element of the first end connector 110 is dependent upon the components that comprise the interior of the electronic smoking article 302.

Turning to FIG. 3C, a perspective view of the assembled electronic smoking article 302 with a PUB instrument 100 (the combination referred herein as the "PUB delivery system" 300) of FIG. 3B is shown, according to an example embodiment. The PUB delivery system 300 has the same general form and structure of the original electronic smoking article 302. The PUB instrument 100 has a size and form that is structured to minimally interfere physically with the intended form of the electronic smoking article 302. The components of the PUB instrument 100 ensure that the performance and use of the PUB delivery system 300 is substantially similar to the performance and use of the electronic smoking article 302.

Referring to FIG. 4A, a perspective view of an assembled electronic smoking article 402 is shown, according to another example embodiment. The electronic smoking article 402 is similar to the electronic smoking article 302. A difference between the electronic smoking article 402 and the electronic smoking article 302 is the construction of the battery 404 and the reservoir 406 of the electronic smoking article 402. The electronic smoking article 402 includes a battery 404 and an oblong reservoir 406 containing a liquid or other smoking material. The battery 404 is removably coupled to the reservoir 406 via complementary interlocking (e.g., snap-fit) interfaces on an end of the battery 404 and an end of the reservoir 406. As will be appreciated, a user of the electronic smoking article 402 can be pushed to snap-fit the battery 404 to the reservoir 406 or pulled apart to replace either component, to charge the battery 404, for maintenance purposes, or similar actions. In some embodiments, the electronic smoking article 402 has an LED indicator end on the battery 404. The LED indicator end will simulate a traditional cigarette lit end, indicating when the electronic smoking article is working. A mouth end on the reservoir 406 allows for the user to breathe into the electronic smoking article 402, drawing in air through the battery 404 to the liquid in the reservoir 406, and, ultimately the mouth end to the user. In one embodiment, inhalation to draw in air starts the vaporization process. Alternatively, activation of a circuit closure (mechanical or optical) starts the vaporization process.

As noted previously, the byproduct generated by the electronic smoking article 402 is not a smoke, but rather an aerosol or a vapor resulting from the volatilization or vaporization of certain components incorporated therein. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). The reservoir 406 contains a liquid that is vaporized and delivered to the user.

Turning to FIG. 4B, a perspective view of an unassembled PUB instrument 414 and the electronic smoking article of FIG. 4A is shown, according to an example embodiment. The PUB instrument 414 is similar to the PUB instrument 100. A difference between the PUB instrument 414 and the PUB instrument 100 is the shape of the housing 104 of the PUB instrument 414 and the first and second end connector (410, 412). As shown in FIG. 4B, the PUB instrument 414 includes a first end connector 410 structured for interlocking interface with the battery end of the electronic smoking article 402. The PUB instrument further includes a second end connector 412 structured for interlocking interface with the reservoir end 406 of the electronic smoking article 402. While the PUB instrument 414 has a different shape, the PUB instrument 414 may include one or more of the components and sensor array 116 described above. While only one PUB instrument 414 is shown in FIG. 4B, in some embodiments, one or more PUB instruments 414 (e.g., modules) may be used in the electronic smoking article 402. In those embodiments, the first end connector 410, the second end connector 412, or both may be structured to couple with another PUB instrument 414. In some embodiments, the housing 104 of the PUB instrument 414 is altered to better fit the form of the electronic smoking article 402. As will be appreciated, the size and type of coupling element of the first end connector 110 is dependent upon the components that comprise the interior of the electronic smoking article 402.

As illustrated in FIG. 4C, the electronic smoking article 402 is assembled with a PUB instrument 414 (the combination referred herein as the "PUB delivery system" 400) of FIG. 4B. The PUB delivery system 400 has the same general form and structure of the original electronic smoking article 402. The PUB instrument 414 has a size and form that is structured to minimally interfere physically with the intended form of the electronic smoking article 402. The components of the PUB instrument 414 ensure that the performance and use of the PUB delivery system 400 is substantially similar to the performance and use of the electronic smoking article 402.

Figure 5:
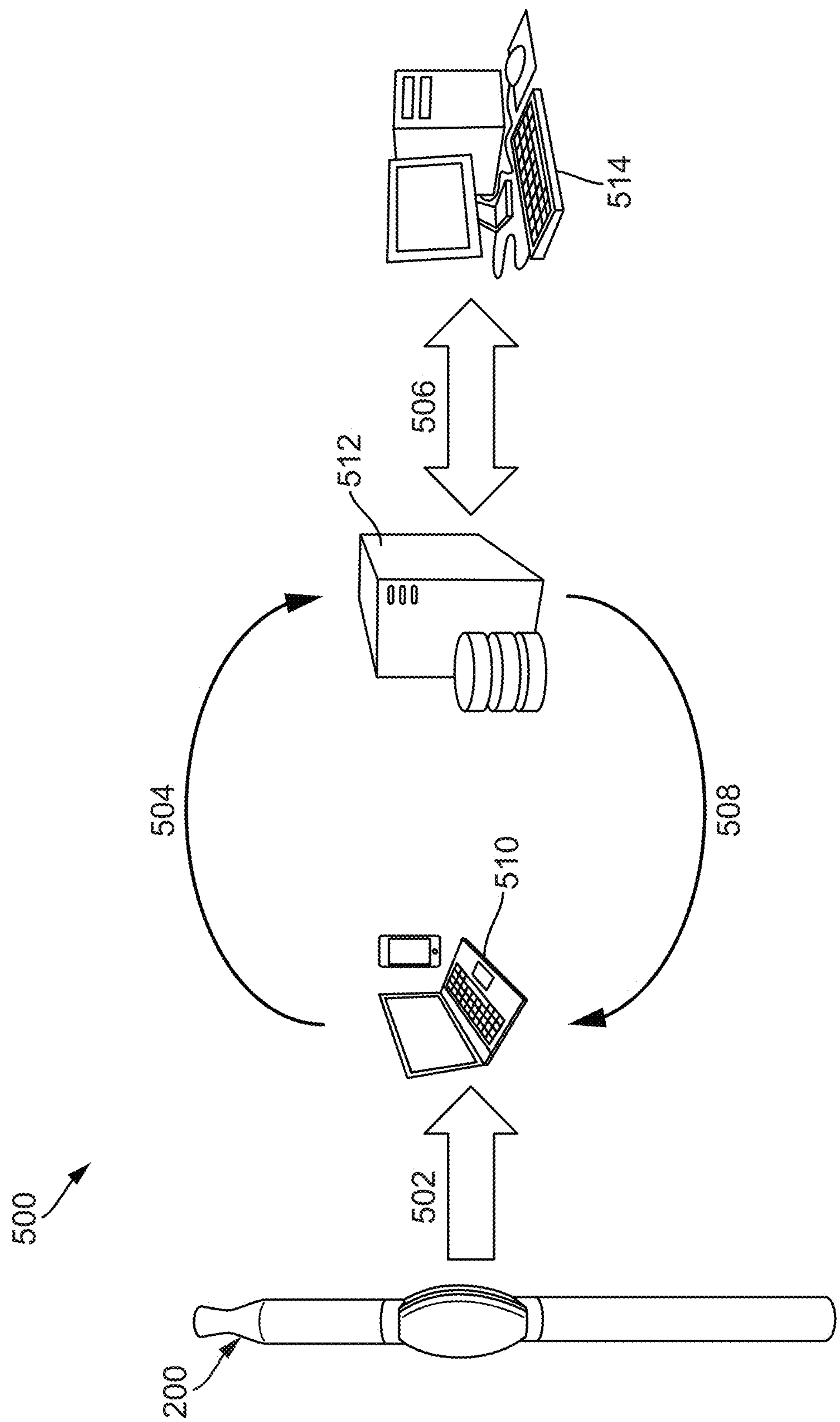
FIG. 5 is a schematic flow diagram illustrating a method for transmitting data from an electronic smoking article with a product use and behavior monitoring instrument, according to an example embodiment.

Referring to FIG. 5, a schematic flow diagram illustrating a method 500 for transmitting data from a PUB delivery system 200 is shown, according to an example embodiment. The method 500 is described in connection with recorded data on a PUB delivery system 200 being synced to a user computing system 510 (e.g., laptop, tablet, desktop, mobile computing device, etc.), a secure server system 512 (e.g., database, cloud storage, etc.), and a clinical computing system 514. The PUB delivery system 200 can be similar PUB delivery system, for example, to the PUB delivery systems (300, 400) of FIGS. 3C and 4C or PUB-THS delivery systems (600, 700, 800) of FIGS. 6C, 7C, and 8C. As will be appreciated, data and results exported and imported meets the standards for clinical data security and integrity.

The method 500 begins at 502 with the PUB delivery system 200 synchronizing data stored on the on-board memory 120 of the PUB delivery system 200 to a user computing system 510 associated with the user. The data synchronization can occur using the antenna 122 of the PUB instrument 100. The data synchronization can be triggered, for example, by the charging cycle of a component of the PUB delivery system 200, during activation of the PUB delivery system 200, continuously throughout the lifecycle of the PUB delivery system 200, or a similar triggering event. In some embodiments, the PUB delivery system 200 uses Bluetooth™ technology to facilitate the transfer of data from the memory of the PUB delivery system 200 to the user computing system 510 through data transfer software (e.g., PC, iOS™, or Android™) In other embodiments, the PUB delivery system 200 has a wired interface that allows for a wired connection to the user computing system 510 through the data transfer software.

The data synchronization may include data related to moment-to-moment use behaviors and patterns of usage behaviors across periods of product interaction (e.g., hourly, daily, weekly) by the user. The PUB delivery system 200 acquires real-time data related to characteristics of individual use (puff) behaviors (e.g., number, duration, volume, inter-puff intervals), how these characteristics change from moment to moment, and how battery characteristics change moment to moment. Using pre-determined and established TPM rates, multiple eMLEs of the PUB delivery system 200 aerosol can be determined. In some embodiments, the conclusion of the data synchronization causes the data stored on the on-board memory 120 to be reset to null values and the on-board clock to be resynced.

At 504, the data transferred from the user computing system 510 is transferred to the secure server system 512 over the network. The network may include, for example, the Internet, cellular networks, proprietary cloud networks, and similar infrastructures. In some embodiments, the transfer is maintained according to appropriate research data standards.

At 506, the data stored on the secure server system 512 is accessed by a clinical computing system 514. One or more clinical computing system 514 may have access to the secure data on the secure server system 512. As will be appreciated, data accessed by the clinical computing system 514 can be input into a graphical-based software program for summary and pattern recognition of electronic smoking article 202 use over specific periods of time. The software may import raw data exported from database on a per-user/per-trial basis. The data may be processed for summarizing and applying algorithms for computing discrete product use elements, product use rate and/or patterns, and the eMLE. Within the software program, information associated with the specific electronic smoking article 202 under evaluation (e.g., TPM data values) needed to perform analytics are modifiable. Data generated by this process may be uploaded onto the secure server system 512.

In some embodiments, the data hosted in the secure server system 512 may be used to communicate 508 with the user computing system 510 to present additional information to the PUB delivery system 200. Such information may comprise, for example, software updates for the PUB instrument, security updates for data transfer and storage, alteration of functions, addition of functions, data presentation to the user, statistics of user usage, additional control functions, authorized user updates, data storage updates, etc. For example, the communication may cause the PUB delivery system to monitor and capture data related to a specific characteristic.

In some embodiments, the PUB instrument may be implemented with a THS electronic smoking article (e.g., a heat-not-burn electronic cigarette) to capture a use data characteristic of a smoking action using the THS electronic smoking article. As used herein, "PUB-THS instrument" refers to a PUB instrument structured for use with a THS electronic smoking article. Generally, a THS electronic smoking article includes a battery, a heating element, a controller, and a cavity for receiving a tobacco stick (e.g., a tobacco source). As will be appreciated, the THS electronic smoking article is a type of electronic smoking article. Depending on the type of THS electronic smoking article, the tobacco stick may be a removable element that is similar in shape and size to a traditional cigarette that can be removed after use. For example, having a tobacco end that is inserted into tobacco stick cavity and mouth end for the user to receive the tobacco aerosol. In other embodiments, the tobacco stick is in the form of removable tobacco that can be placed adjacent to the heating element in a tobacco holder and removed/cleaned out after use. While the THS smoking article is described as heating a tobacco element/product in a tobacco stick with a tobacco heating element, the PUB-THS instrument may be used to monitor the heat-not-burn use of a wide variety of smoking products and consumables. For example, the PUB-THS instrument may be used to monitor the smoking (e.g., consumption, heating temperature, duration, etc.) and non-smoking (e.g., movement, location, break time, etc.) actions of a smoking article that heats-not-burns a nicotine, tetrahydrocannabinol, cannabinoid, or similar heat-not-burn consumables. The PUB-THS instrument may also be used to monitor the heat-not-burn use of a variety of pharmaceutical products.

The heating element is structured to heat the tobacco stick such that it produces tobacco vapor or aerosol, not tobacco smoke (as with combustion). As will be appreciated, the tobacco stick may comprise little or no tobacco, but rather an alternative consumable product that is heated and not burned. The heating element may surround the tobacco stick, for example, heating the outside of the tobacco stick. Alternatively, the heating element may be inserted into the tobacco stick, for example, as a protrusion that enters the tobacco stick from the inserted tobacco end and heat up the tobacco surrounding the heating element. In some embodiments, both configurations (inside-out and outside-in) are implemented. Generally, the heating element heats the tobacco to temperatures up to 350° C. The controller is configured to monitor and control the temperature of the heating element to ensure a consistent taste experience and to avoid over-heating. The produced tobacco aerosol may include water, glycerol, and other vaporized substances (e.g., flavors) present in the original tobacco mixture. The user of the THS electronic smoking article activates/initiates the heating element to begin the smoking action. In some embodiments, the user of the THS electronic smoking article may need to push a button to activate the heating element; in other arrangements, the user begins puffing the THS electronic smoking article to activate the heating element. In some embodiments, the user may activate the THS electronic smoking article through a fingerprint scan, activating a mobile application on a user device, remote activation, or other activation mechanisms.

Beneficially, the PUB-THS instrument is structured for retrofitting onto a variety of THS electronic smoking articles, as it is adaptable to a wide variety of battery-tank, battery-tobacco stick, or battery cartridge connections of the THS electronic smoking article. The PUB-THS instrument includes at least one connector on either end of the board or the housing to allow the PUB-THS instrument to attach to the THS electronic smoking article. Expanding generally, in some embodiments, the PUB-THS instrument attaches to the portion of the THS electronic smoking article where airflow enters the heater chamber, thereby allowing the PUB-THS instrument to record actual air passage into the heating chamber without impeding airflow required for normal product functioning. In other embodiments, the PUB-THS instrument is located between the THS electronic smoking article power source and the heating chamber. In other words, the PUB-THS instrument includes two connecters, on one end, a connector for the heater element portion of the THS electronic smoking article and on the opposite end, a connector for the battery portion of the THS electronic smoking article. In another embodiment, the PUB-THS instrument may be formed to encompass the portion of the THS electronic smoking article of the consumable product (e.g., cigarette stick) that the user interacts with. For example, the PUB-THS instrument may be a shroud formed in the shape of a protrusion formed by the cigarette stick loaded into the THS electronic smoking article. In any embodiment, the components of the PUB-THS instrument are encased in a housing that allows the PUB-THS instrument to be used on a broad range of THS electronic smoking articles without interfering with the use and/or the functions of the THS electronic smoking article. Further, the PUB-THS instrument includes one or more Venturi airflow chambers disposed (e.g., molded, coupled, etc.) into an internal cavity of the PUB-THS instrument structured to allow accurate measurements of changes in air pressure and air flow by capturing pressure across the constricted portion of the Venturi tube. Alternatively, the PUB-THS instrument may include one or more orifices disposed (e.g., molded, coupled, etc.) in an internal cavity of the PUB-THS instrument structured to allow accurate measurements of changes in air pressure and air flow by capturing pressure across the constricted portion of the orifice.

As will be appreciated, the PUB-THS instrument can record and detect battery activation of the THS electronic smoking article, battery characteristics (e.g., wattage, voltage, and resistance), location (e.g., global position), orientation of instrument, movement of instrument, temperature of airflow entering THS electronic smoking article, and sound of airflow entering THS electronic smoking article. In regard to user usage, the PUB-THS instrument can measure use characteristics, moment-to-moment and patterns over periods of time (e.g., hourly, daily, weekly), puff behaviors (e.g., number, duration, volume, inter-puff intervals, etc.), and changes in characteristic throughout a smoke session or over periods of time. Generally, the PUB-THS instrument includes an array of sensors to record product use characteristics, an on-board memory to store collected data, an on-board rechargeable power source, a wireless (e.g., Bluetooth™) communication array to transfer data to an external storage location, a first connector for a tank end, and a second connector for a battery end. Once a PUB-THS instrument is installed on a THS electronic smoking article, data monitoring and collection may be triggered or continuous by activation and deactivation of the THS electronic smoking article. At the completion of a segment of data acquisition, the PUB-THS instrument may synchronize with a wireless communication-compatible computing device (e.g., desktop, laptop, tablet, smartphone, etc.) and upload the data to a secure database. Data may be exportable to any statistical software package for further analysis or to task specific summarization software. As will be appreciated, the PUB-THS instrument may be utilized for clinical and non-clinical research to capture and track use of a THS electronic smoking article use data for behavioral modelling, to track use, and to provide information about use patterns.

Figure 6C:
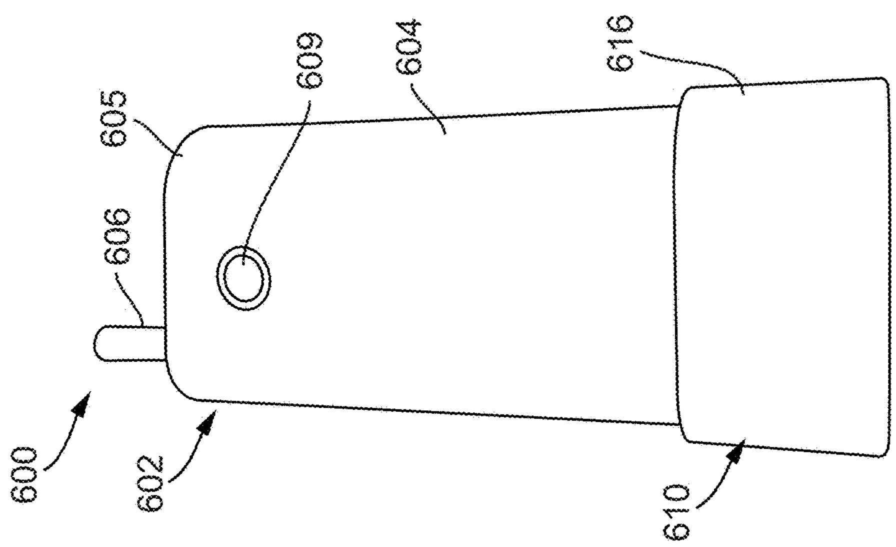
FIG. 6C is a perspective view of the electronic smoking article assembled with the product use and behavior monitoring instrument for tobacco heating systems of FIG. 6B.
Figure 6B:
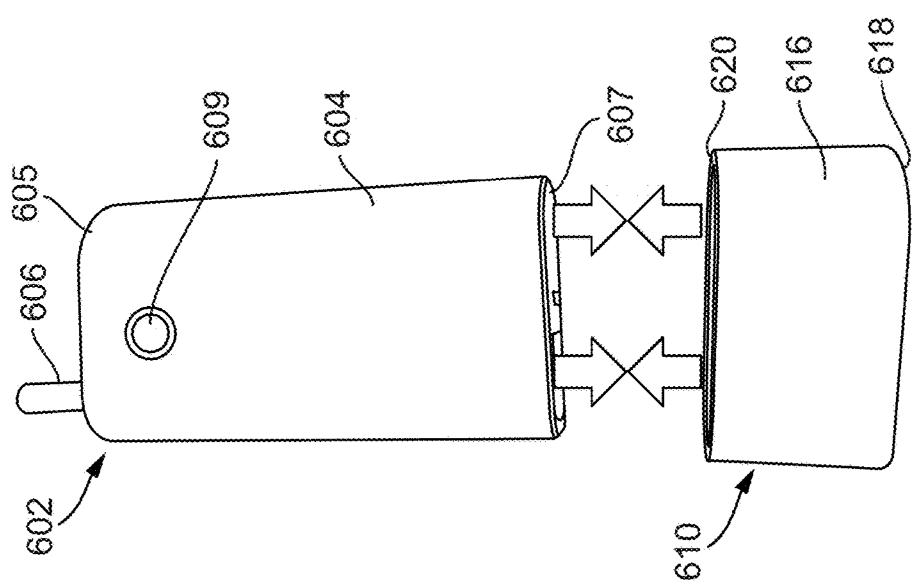
FIG. 6B is a perspective view of a product use and behavior monitoring instrument for tobacco heating systems and the electronic smoking article of FIG. 6A unassembled, according to a further example embodiment.
Figure 6A:
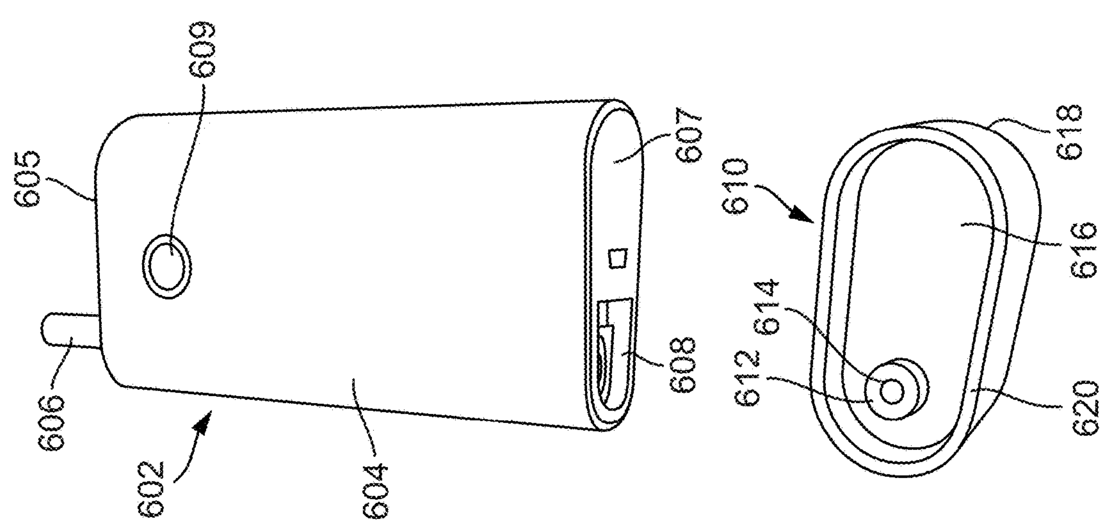
FIG. 6A is a perspective view of an assembled electronic smoking article and a product use and behavior monitoring instrument for tobacco heating systems, according to another example embodiment.

Referring to FIG. 6A, a perspective view of a THS electronic smoking article 602 and PUB-THS instrument 610 are shown unassembled, according to an example embodiment. The THS electronic smoking article 602 includes a housing 604 with a first end 605, a second end 607, and an activation switch 609. The second end 607 includes an airflow port 608 configured to facilitate airflow through the housing 604 of the THS electronic smoking article 602. The first end 605 includes a tobacco stick cavity (not shown) to receive a tobacco stick 606. In some embodiments, the tobacco stick 606 is a permanent structure on the housing 604 in fluid communication with the tobacco stick cavity that tobacco sticks or loose-leaf tobacco can be inserted and heated in. The mouth end on the tobacco stick 606 allows for the user to breathe into or draw from the THS electronic smoking article 602, drawing in air through the airflow port 608, which travels through the THS electronic smoking article 602 and tobacco, and, ultimately the mouth end to the user. In one embodiment, air drawn in through inhalation starts the vaporization process. Alternatively, activation of a circuit closure (mechanical or optical), such as the activation switch 609, starts the vaporization process.

Internal to the THS electronic smoking article 602 (e.g., inside the housing 604 and not shown) may be a circuit board, a battery, a heating element, and the tobacco stick cavity. The battery powers the THS electronic smoking article 602, including the heating element. The circuit board is structured to activate, deactivate, control heating and use of the heating element, and control other components of the THS electronic smoking article 602. The heating element may surround the tobacco stick 606, heating the tobacco from the outside-in, it may be inserted into the tobacco stick 606, heating the tobacco from the inside-out, or a combination of the two. As another example, in some embodiments an inductive heating arrangement may be used, which may include an inductive coil (or multiple inductive coils) and one or more susceptors, which may be positioned adjacent the tobacco stick 606, inserted into the tobacco stick 606, and/or comprise susceptor particles integrated into the tobacco stick 606. In some embodiments, the THS electronic smoking article 602 has an LED indicator to indicate that the heating element is active. As shown in FIG. 6A, the LED is around the activation switch 609. The activation switch 609 allows the user to activate or deactivate the heating element and use the THS electronic smoking article 602.

As shown in FIG. 6A, the PUB-THS instrument 610 includes a housing 616 with a first end 618 and second end 620. The second end 620 is configured to interface with the second end 607 of the THS electronic smoking article 602 via a connector. In some embodiments, the connector is a part of a controller (not shown) internal of the housing 616. In other embodiments, the connector is a part of the housing 616. The first end 618 includes an airflow port (not shown) in fluid communication with the airflow port 614 of the second end 620. The second end 620 of the of the PUB-THPTHS instrument 610 includes an airflow port 614 and a sensor holder 612. The airflow port 614 is in fluid communication with Venturi tubing internal of the housing 616. One or more Venturi airflow chambers (not shown) may be molded into an internal cavity of the PUB-THS instrument 610. The use of a Venturi airflow chamber enhances the ability of the PUB-THS instrument 610 to accurately measure changes in air pressure/flow as the subject is using the THS. Specifically, a pressure transducer sensor in the PUB-THS instrument 610 is able to measure changes in pressure differential across the constricted portion of a Venturi tube to determine air flow rate. For example, the inter-puff-interval ("IPI") may be measured by recording the time between when a puff is concluded (airflow termination) and the initiation of the next puff (e.g., airflow initiation) as long as these events take place during a period of time where the heating element is at temperature and there is consumable product (e.g., tobacco) to consume. This data may be stored and uploaded in raw data format, time and date stamped, and used to generate puff, rapid-puffs, and sub-puff counts and duration values as well as IPI counts and duration values. As will be appreciated, one or more orifices may be disposed internal of the housing 616 in order to enhance the ability of the PUB-THS instrument 610 to accurately measure changes in air pressure/flow as the subject is using the THS.

Expanding upon the PUB-THS instrument 610, the PUB-THS instrument 610 monitors, records, and transmits a plurality of user usage data and THS electronic smoking article device data. The PUB-THS instrument 610 is structured to have a form, size, and connectors that allow it to be adapted to interface with the bottom of the THS electronic smoking article 602 without interfering with the operation of the THS electronic smoking article 602. As will be appreciated, the PUB-THS instrument 610 may be used in both controlled and limited control environments, under supervision and unsupervised, durable, and in accordance with product safety standards for mobile research equipment. Internal of the housing 616 is a controller (not shown). The controller may be similar to the controller of the PUB instrument 100 of FIG. 1 configured to be disposed in the housing 616 of the PUB-THS instrument 610. The controller includes a sensor array, a PUB battery, on-board memory, and an antenna. The controller is structured to monitor, record, and store a plurality of data and characteristics of the user and THS electronic smoking article 602. The controller is structured to have a size, and in some embodiments a connector, that will interface with a wide variety of THS electronic smoking articles and interfere as little as physically possible with the intended form of a THS electronic smoking article 602.

The controller acquires real-time data related to characteristics of individual puff behaviors (e.g., number, duration, volume, inter-puff intervals), change in puff characteristics from moment to moment, change in puff characteristics over a duration of time, and similar information. For example, captured puffing characteristics could include, but is not limited to, puff volume (ml), puff duration (s), number of puffs, number of sub-puffs, mean and peak flow (ml/s), mean and peak draft (ml/s), mean and peak resistance, mean and peak pressure drop (mmWg), inter puff interval (s), and time lit (s). The controller may also acquire battery characteristics (e.g., wattage, voltage, and resistance), location, orientation of instrument, movement of instrument, temperature of airflow entering the THS electronic smoking article 602, and sound of airflow entering THS electronic smoking article 602. The controller facilitates the storage of the data characteristics relating to moment-to-moment user use behaviors and patterns of usage across bouts of product interaction (e.g., hourly, daily, weekly). The controller and associated elements can be physically implemented on a circuit board.

The on-board memory is structured to store data and characteristics collected by the sensor array. The on-board memory may, for example, be flash memory or electrically erasable programmable read-only memory ('EEPROM") memory. The on-board memory should provide sufficient memory capacity to allow storage of the highest estimated data load generated over a set period, for example, a seven-day period. In some embodiments, the on-board memory may be reset to null values and the on-board clock resynced once data is upload. In other embodiments, the on-board memory is structured to maintain all data until the on-board memory reaches capacity. The on-board memory may store data in raw data format, time and date stamp it, and use it to determine wattage values. As will be appreciated, the wattage values coupled with puff duration values may be used to generate a Total Particulate Matter ("TPM") constant for the estimated mouth-level exposure ("eMLE") of the aerosol measure. The data captured by the sensor array is stored in the on-board memory in both discrete individual data points and as part of a time- and date-stamped cumulative record.

The PUB-THS battery includes an on-board, rechargeable battery. The PUB-THS battery may also be a rechargeable solid-state battery. The PUB-THS battery powers the PUB-THS instrument 610 and is structured to ensure that performance of data collection by the PUB-THS instrument 610 will not affect the performance of the battery. The PUB-THS battery should be able to maintain a charge throughout the highest estimated level of subject use. In some embodiments, the PUB-THS battery will last for at least seven days without having to be re-charged. In some embodiments, the PUB-THS battery is recharged when the THS electronic smoking article 602 battery is recharged. In other embodiments, the PUB-THS instrument 610 includes a charging port on the housing 616 that can charge the PUB-THS battery. In some embodiments, the PUB-THS instrument 610 does not have a PUB-THS battery; instead the PUB-THS instrument 610 draws power from the battery of the THS electronic smoking article 602.

The antenna is structured to transmit data collected by the sensor array and stored by the on-board memory. The antenna may be structured to upload data during the charging cycle of the electronic smoking article, during activation of the THS electronic smoking article 602, continuously throughout the lifecycle of the THS electronic smoking article 602, or at similar triggering events. In some embodiments, on-board memory may be reset to null values and the on-board clock resynced once the data upload by the antenna concludes. In some embodiments, the PUB-THS instrument uses a wireless technology (e.g., Bluetooth technology) to facilitate the transfer of data from the memory of the PUB-THS instrument 610 to a secured location (e.g., a server location) through data transfer software (e.g., PC, iOS™, or Android™). With the transmission of the data over Bluetooth,™ or other wireless communication technology, the antenna is designed to limit interference with the aerosol generated as much as possible. In other embodiments, the antenna has a wired interface that allows for a wired connection to the secured location through the data transfer software. Data security and integrity during migration from the antenna of the PUB-THS instrument 610 to the computer or smart device, to the database server may be maintained according to appropriate research data standards. In some embodiments, the data hosted in the secure database may be used to communicate with the PC and/or Smart Device (Smartphone and/or Tablet) to present additional information to the user of the PUB-THS instrument 610.

The sensor array is structured to monitor and record one or more data characteristics of the THS electronic smoking article 602 and the user usage data. The sensor array is structured to monitor and record a wide variety of user usage characteristics and data. The sensor array can capture real-time data related to characteristics of individual use behaviors (e.g., number, duration, volume, inter-puff intervals), how these characteristics change from moment to moment, and how battery characteristics, such as power (e.g., wattage), change moment to moment. The sensor array may measure the time between when a puff is concluded (e.g., battery deactivation) and the initiation of the next puff (e.g., battery activation), also known as the IPI. As will be appreciated, the puff statistics captured by the sensor array can be used to capture puff, rapid-puffs, and sub-puff counts and duration values as well as IPI counts and duration values. In some embodiments, the sensor array monitors and captures the activation of the battery or heating element—which aligns with the initiation of a puff—and measures the time that the battery is active to determine puff duration. Further, the sensor array can capture the temperature of the heater during each puff duration. In other embodiments, the sensor array may record the conclusion of the puff when the battery is no longer active.

In regard to the THS electronic smoking article 602, the sensor array may include specific sensors to detect battery activation of the THS electronic smoking article, battery characteristics (e.g., wattage, voltage, current, and resistance), or duration of battery use (e.g., length of smoke session). As will be appreciated, the data captured by the sensor array is stored in the on-board memory in both discrete individual data points and as part of a time and date-stamped cumulative record. As discussed in greater detail above, the sensor array may include a pressure transducer sensor to measure change in pressure differential across one or more Venturi airflow chambers or orifices.

The sensor array may include hardware sensors that detect the presence of the tobacco stick 606 in the THS electronic smoking article 602. The hardware sensors may be used to verify that the tobacco stick 606—either in the stick, loose-leaf, or other form—is properly inserted into the THS electronic smoking article 602 and is properly heated by the heating element. The sensor may be configured to identify the type of consumable (e.g., tobacco and non-tobacco products, or specific variants thereof) used in the THS electronic smoking article 602 and the amount of the consumable. The sensor may determine tobacco stick insert pressure, tobacco stick amount (in the case of loose-leaf tobacco), load duration, removal frequency, and other interactions of the tobacco stick 606 and the THS electronic smoking article 602. In some embodiments, the sensor array may verify that the tobacco stick is a genuine (e.g., authorized, not counterfeit, etc.) tobacco stick. Such non-authorized tobacco sticks may not conform to original manufacturer quality, performance, and safety parameters.

In some embodiments, the sensor array includes hardware sensors that track the position of the THS electronic smoking article while being used. For example, a 9-axis gyroscope is used to capture the orientation of the PUB-THS instrument 610, an accelerometer to capture the movement of the PUB-THS instrument 610, or a GPS or other satellite navigation system to capture the location of the PUB-THS instrument 610. In such embodiments, the position tracker(s) can be used to generate data concerning the location of the THS electronic smoking article 602 in regards to the location relationship between the first end 605 and second end 607 of the THS electronic smoking article 602. Beneficially, recording this location relationship allows for the researchers to determine how the user was holding the THS electronic smoking article 602 while performing a puff. Determining if the user was holding the THS electronic smoking article 602 while sitting in a manner similar to a traditional cigarette vs. smoking the THS electronic smoking article 602 while lying on the couch with the battery above the tank provides more information regarding regular use of the THS electronic smoking article 602 and can provide details relevant to tank leakage and mal-/miss-functioning of the THS electronic smoking article 602. Additionally, the position sensor(s) may be used to track speed of movement of the THS electronic smoking article 610 from one position to another, whereby the linear acceleration may be used to identify the start or conclusion of THS electronic smoking article 602 use.

The sensor array may include hardware sensors that detect changes in the ambient temperature within airway ports of the THS electronic smoking article 602. The temperature changes may be used to identify when a puff is initiated and ongoing use of the THS electronic smoking article 602. In some embodiments, the PUB-THS instrument 610 may include hardware sensors that detect the speed of movement of the PUB-THS instrument 610 from one position to another. In those embodiments, linear acceleration of the PUB-THS instrument 610 is measured in relation to use/non-use to identify the beginning of a period of product use. In other embodiments, the PUB-THS instrument 610 may include hardware sensors that record the frequency of the sound of air passing through dedicated airway ports on the PUB-THS instrument 610. In such embodiments, the use of passive acoustic measurements may provide information to understand puff velocity and the general shape of individual puff characteristics.

The PUB-THS instrument 610 may also include hardware sensors that track and record events measured by other components that make up the PUB-THS instrument 610. Beneficially, this tracking is date and time stamped such that all recorded events form a cumulative record. The cumulative record is trackable and exportable to any statistical software package for further analysis or to task specific summarization software. In other embodiments, the PUB-THS instrument 610 may receive the externally processed cumulative record via a download to the PUB-THS instrument 610. In such embodiments, the PUB-THS instrument 610 may perform additional analysis or task specific summarization of the externally processed data. In other embodiments, the PUB-THS instrument 610 performs information and feedback analysis of the cumulative record within the device. In other embodiments, the PUB-THS instrument 610 may include a photo-, mechanical-, and/or pressure sensor that will detect if the PUB-THS instrument 610 has been removed from the battery and/or tank end of the electronic smoking article.

In some embodiments, the PUB-THS instrument 610 includes a toggle function on the controller. The toggle function can turn on, turn off, limit, or alter one or more data characteristics monitoring and recorded by the PUB-THS instrument 610. For example, the toggle function may limit the total puffs generated (e.g., in terms of duration, number, or a combination of both) over a specific period of time (e.g., minutes/hours/days/weeks, etc.) in order to limit the number of uses of a THS electronic smoking article. In other embodiments, the PUB-THS instrument 610 includes a single activation button that can be used to trigger or mark events (e.g., date/time/location) that occur during the course of usage of the electronic smoking article. In some embodiments, the PUB-THS instrument 610 includes a screen (e.g., LCD, LED, OLED, or other suitable screen) inserted on the housing 616. The screen displays the status of any of the events that the PUB-THS instrument 610 records or manages. The screen may also facilitate the user to adjust the data the sensor array monitors and records, for example through the toggle function. The user may use the screen to select an "off" option for one or more data characteristics collected, for example, location of the user throughout usage of the PUB-THS instrument 610. The toggle function may include functions to modify the wattage delivered to the heating element within the heating chamber of the THS electronic smoking article 602. The user may use this toggle function to modify the total wattage delivered to an amount less than the wattage produced by the THS battery to a level as low as zero. Further, the toggle function may be used to track and record events measured by other components that make up the PUB-THS instrument 610 or PUB-THS instrument 610.

A PUB-THS instrument 610 may also include an identifier related to the structure and characteristics of the PUB-THS instrument 610. The identifier is updatable for each user throughout the use of the PUB-THS instrument 610. As will be appreciated, this would allow a user to switch between a clinical (e.g., data captured for a third party's analysis) or non-clinical (e.g., data captured for the user's analysis) study. The identifier can be incorporated into the data set to allow for alignment of data type (e.g., clinical, non-clinical, specific user, PUB-THS instrument 610 type) a data source. Additionally, the identifiers may be encoded into the PUB-THS instrument 610 and visually apparent through an embossed portion of—or affixed by label to—the housing 616 of the PUB-THS instrument 610. In some embodiments, the sensor array may include an access control through biometric security sensor such as, for example, a fingerprint sensor to detect fingerprint characteristics. In those embodiments, the use of the THS electronic smoking article 602 and/or the data characteristic collection may only occur if the fingerprint sensor captures a fingerprint from an authorized user (e.g., associated with the PUB-THS instrument). As will be appreciated, a biometric security sensor may be structured to capture a wide variety of biometric data (e.g., iris, voice, gait, etc.) from an authorized user.

In certain embodiments, the PUB-THS instrument 610 is configured as a series of modules. A single module PUB-THS instrument 610 may be located between the battery end and tank end of a THS electronic smoking article 602. A single module PUB-THS instrument 610 may be structured to monitor and record a single or multiple data or characteristics. Multiple module PUB-THS instruments 610 may be connected along the THS electronic smoking article 602 to monitor and record a single or multiple data or characteristics. As will be appreciated, with module PUB-THS instruments 610 a THS electronic smoking article 602 can be tailored to capture a specific subset of data and characteristics. For example, a user may want to utilize the PUB-THS instrument 610 to capture data characteristics, but not allow the transmission or capture of any location data. Therefore, the user's THS electronic smoking article 602 could include module PUB-THS instruments 610 that monitor and record data or characteristics unrelated to location. In some embodiments, the PUB-THS instrument 610 includes a chip that is structured to interface on a THS electronic smoking article 602 and collect least one use data characteristic.

As will be appreciated, data collected by the sensor array 116 can be input into a graphical-based software program for summary and pattern recognition of THS electronic smoking article 602 use over specific periods of time. The software may import raw data exported from database on a per-user/per-trial basis. The data may be processed for summarizing and applying algorithms for computing discrete product use elements, product use rate and/or patterns, and the eMLE of the aerosol measure. Within the software program, information associated with the specific THS electronic smoking article 602 under evaluation (e.g., TPM data values) needed to perform analytics are modifiable. Data generated by this process may be uploaded to the PUB-THS instrument 610 database. As will be appreciated, data imported and results exported meet standards for data security and integrity. In other embodiments, the data collected by the sensor array is sent to a task specific summarization software.

In some embodiments, the controller includes a coupling element structured to removably couple to, and interface with, the airflow port 608 and second end 607 of the THS electronic smoking article 602. A wide variety of different coupling mechanisms may be used for attaching the PUB-THS instrument 610 to the THS electronic smoking article 602, including a protrusion extending from the controller, that interfaces with the THS electronic smoking article 602. As will be appreciated, the size and type of coupling element of the coupling element is dependent upon the components that comprise the interior of a specific THS electronic smoking article. In some embodiments, the PUB-THS instrument 610 is removably coupled to the THS electronic smoking article 602 via complementary interlocking (e.g., snap-fit) interfaces on the second end 620 of the PUB-THS instrument 610 and the second end 607 of the THS electronic smoking article 602. As will be appreciated, a user of the PUB-THS instrument 610 can push to snap-fit it with the THS electronic smoking article 602, subsequently, they can be pulled apart to replace either component, to charge the battery, for maintenance purposes, or similar actions. Alternative complementary interlocking interfaces on the second end 620 of the PUB-THS instrument 610 and the second end 607 of the THS electronic smoking article 602 could be used, for example, torsional-fit, press-fit, friction-fit, overlap lock-fit, and similar connective interfaces.

FIG. 6B illustrates a perspective view of an unassembled PUB-THS instrument 610 and the THS electronic smoking article 602 of FIG. 6A, according to an example embodiment. As shown in FIG. 6B, the PUB-THS instrument 610 includes a connector on the second end 620 structured for an interlocking interface with the second end 607 of the THS electronic smoking article 602. The PUB-THS the instrument 610 will attach to the THS electronic smoking article 602 so that it can record functions and characteristics of the THS electronic smoking article 602 without impeding airflow required for normal functions. As will be appreciated, the PUB-THS instrument 610 may include one or more of the components and sensor array described above. While only one PUB-THS instrument 610 is shown in FIG. 6B, in some embodiments, one or more PUB-THS instrument 610 (e.g., modules) may be used in the THS electronic smoking article 602. In those embodiments, and additional connector, on the first end 618, the second end 620, or both ends may be structured to couple with another PUB-THS instrument 610. In some embodiments, the housing 616 of the PUB-THS instrument 610 is altered to better fit the form of the THS electronic smoking article 602. As will be appreciated, the size and type of coupling element of the connector of the second end 620 is dependent upon the components that comprise the exterior and interior of the THS electronic smoking article 602.

Turning to FIG. 6C, a perspective view of the assembled THS electronic smoking article 602 with a PUB-THS instrument 610 (the combination referred herein as the "PUB-THS delivery system" 600) of FIG. 6B is shown, according to an example embodiment. The PUB-THS delivery system 600 has the same general form and structure of the original THS electronic smoking article 602. The PUB-THS instrument 610 has a size and form that is structured to minimally interfere physically with the intended form of the THS electronic smoking article 602. The components of the PUB-THS instrument 610 ensure that the performance and use of the PUB-THS delivery system 600 is substantially similar to the performance and use of the THS electronic smoking article 602.

Figure 7C:
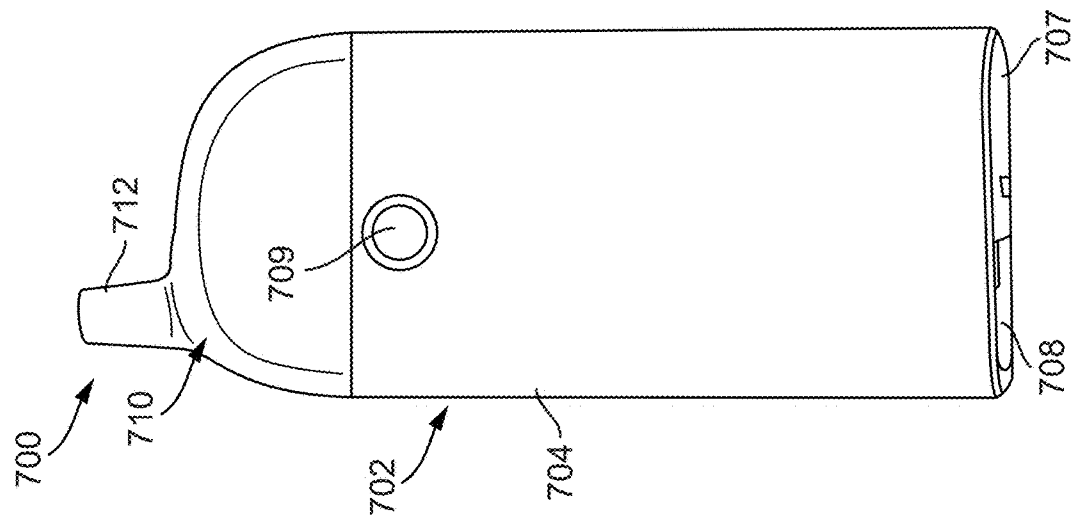
FIG. 7C is a perspective view of the electronic smoking article assembled with the product use and behavior monitoring instrument for tobacco heating systems of FIG. 7B.
Figure 7B:
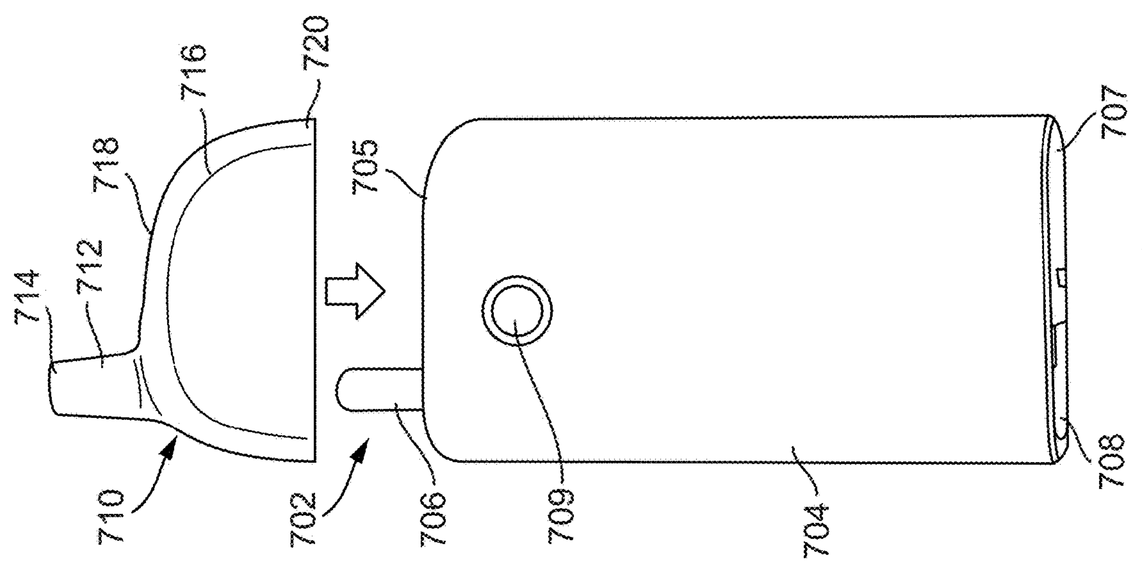
FIG. 7B is a perspective view of an unassembled product use and behavior monitoring instrument for tobacco heating systems and the electronic smoking article of FIG. 7A, according to a further example embodiment.
Figure 7A:
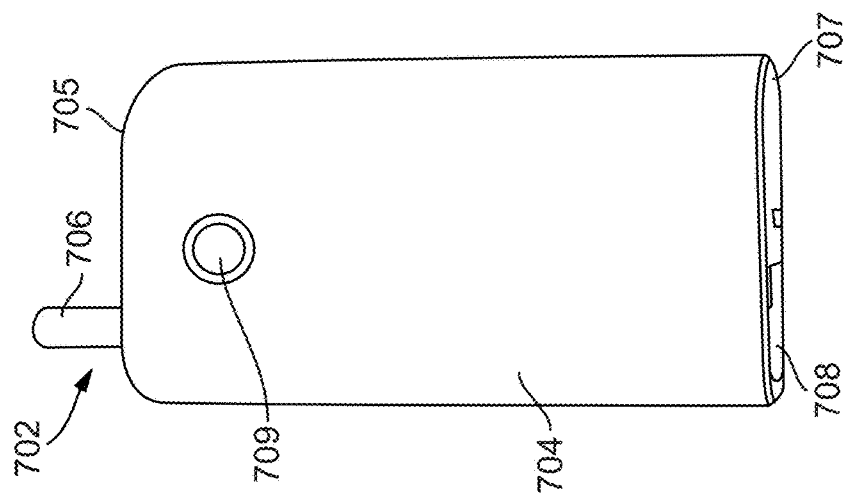
FIG. 7A is a perspective view of an assembled electronic smoking article, according to a further example embodiment.

Referring to FIG. 7A, a perspective view of an assembled THS electronic smoking article 702 is shown, according to another example embodiment. The THS electronic smoking article 702 is similar to the THS electronic smoking article 602. As noted previously, the byproduct generated by the THS electronic smoking article 702 is not a smoke, but rather an aerosol or a vapor resulting from the heating of tobacco in the tobacco stick 706. For example, inhalable substances can be substantially in the form of an aerosol (i.e., a suspension of fine solid particles or liquid droplets in a gas). The THS electronic smoking article 702 includes a housing 704 with a first end 705, a second end 707, and an activation switch 709. The second end 707 includes an airflow port 708 configured to facilitate airflow through the housing 704 of the THS electronic smoking article 702. The first end 705 includes a cavity (not shown) to receive a tobacco stick 706. In some embodiments, the tobacco stick 706 is a permanent structure on the housing 704 in fluid communication with the tobacco stick cavity that tobacco sticks or loose-leaf tobacco can be inserted and heated in. The mouth end on the tobacco stick 706 allows for the user to breathe into or draw from the THS electronic smoking article 702, drawing in air through the airflow port 708, which travels through the THS electronic smoking article 702 and heated tobacco, and, ultimately the mouth end to the user. In one embodiment, inhalation to draw in air starts the vaporization process. Alternatively, activation of a circuit closure (mechanical or optical), such as the activation switch 709, starts the vaporization process.

Turning to FIG. 7B, a perspective view of an unassembled PUB-THS instrument 710 and the THS electronic smoking article 702 of FIG. 7A is shown, according to an example embodiment. The PUB-THS instrument 710 is similar to the PUB-THS instrument 610 such that the internal structure (e.g., controller, sensory array, etc.) of the PUB-THS instrument 710 is similar or identical in form and/or function to the PUB-THS instrument 610. A difference between the PUB-THS instrument 710 and the PUB-THS instrument 610 is the shape of the housing 716 of the PUB-THS instrument 710, the coupling element, and the connection location of the PUB-THS instrument 710. As shown in FIG. 7B, the PUB-THS instrument 710 encompasses the portion of the first end 705 of the THS electronic smoking article 702 and the tobacco stick 706 protruding out of the first end 705. In other words, the PUB-THS instrument 710 includes a portion (e.g., hollow protrusion) that fits, in a similar manner to a shroud, over the location of a loaded tobacco stick and/or location that the user interacts with to consume the tobacco product. The PUB-THS instrument 710 includes a protrusion 712 with an airflow opening 714 extending from the second end 718 of the housing 716 and a first end 720 that interfaces to couple with the first end 720 of the THS electronic smoking article 702.

The protrusion 712 is in fluid communication with the tobacco stick 706 such that inhalation through the airflow opening 714 is substantially similar to the consumption of the tobacco without the PUB-THS instrument 710 installed (e.g., just the THS electronic smoking article 702). While the PUB-THS instrument 710 has a different shape, the PUB-THS instrument 710 may include one or more of the components (e.g., controller, sensor array, etc.) described above. While only one PUB-THS instrument 710 is shown in FIG. 7B, in some embodiments, one or more PUB-THS instruments 710 (e.g., modules) may be used in the THS electronic smoking article 702. In those embodiments, the first end 720, the second end 718, or both may be structured to couple with another PUB-THS instrument 710. In some embodiments, the housing 716 of the PUB-THS instrument 710 is altered to better fit the form of the THS electronic smoking article 702. As will be appreciated, the size and type of coupling element of the coupling element on the first end 720 and/or internal of the housing 716 is dependent upon the components that comprise the interior of the THS electronic smoking article 702.

A wide variety of different coupling mechanisms may be used for attaching the PUB-THS instrument 710 to the THS electronic smoking article 702, including a snap-fit interface on the housing 716 to interface with the THS electronic smoking article 702. As will be appreciated, the size and type of coupling element of the coupling element is dependent upon the components that comprise the interior of a specific THS electronic smoking article. In some embodiments, the PUB-THS instrument 710 is removably coupled to the THS electronic smoking article 702 via complementary interlocking (e.g., snap-fit) interfaces on the first end 720 of the PUB-THS instrument 710 and the first end 705 of the THS electronic smoking article 702. As will be appreciated, a user of the PUB-THS instrument 710 can push to snap-fit it with the THS electronic smoking article 702, subsequently, they can be pulled apart to replace either component, to charge the battery, for maintenance purposes, or similar actions. Alternative complementary interlocking interfaces on the first end 720 of the PUB-THS instrument 710 and the first end 705 of the THS electronic smoking article 702 could be used, for example, torsional-fit, press-fit, friction-fit, overlap lock-fit, and similar connective interfaces.

As illustrated in FIG. 7C, the THS electronic smoking article 702 is assembled with a PUB-THS instrument 710 (the combination referred herein as the "PUB-THS delivery system" 700) of FIG. 7B. The PUB-THS delivery system 700 has the same general form and structure of the original THS electronic smoking article 702. The PUB-THS instrument 710 has a size and form that is structured to minimally interfere physically with the intended form of the THS electronic smoking article 702. The components of the PUB-THS instrument 710 ensure that the performance and use of the PUB-THS delivery system 700 is substantially similar to the performance and use of the THS electronic smoking article 702.

Figure 8C:
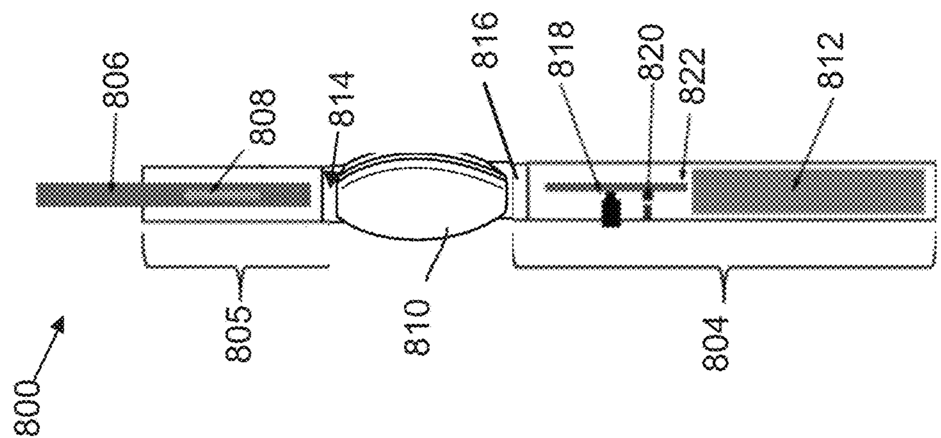
FIG. 8C is a cross-sectional perspective view of the electronic smoking article assembled with the product use and behavior monitoring instrument for tobacco heating systems of FIG. 8B.
Figure 8B:
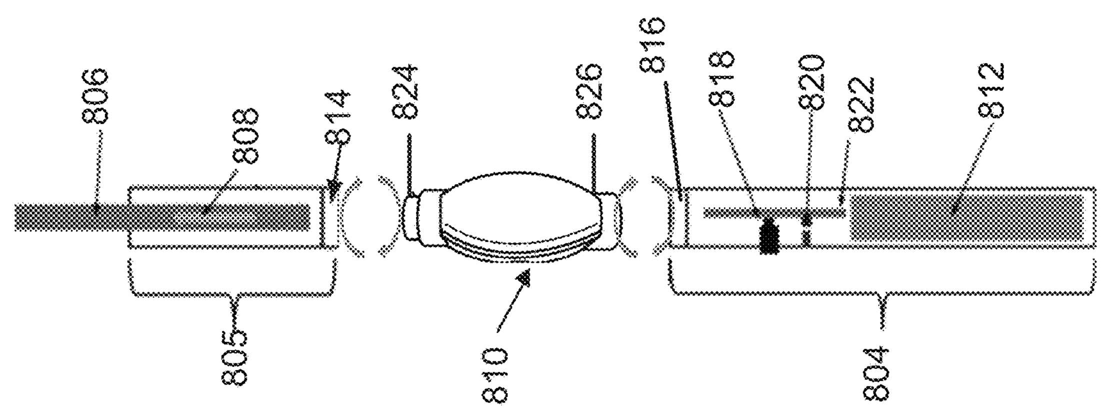
FIG. 8B is a cross-sectional perspective view of a product use and behavior monitoring instrument for tobacco heating systems and the electronic smoking article of FIG. 8A unassembled, according to a further example embodiment.
Figure 8A:
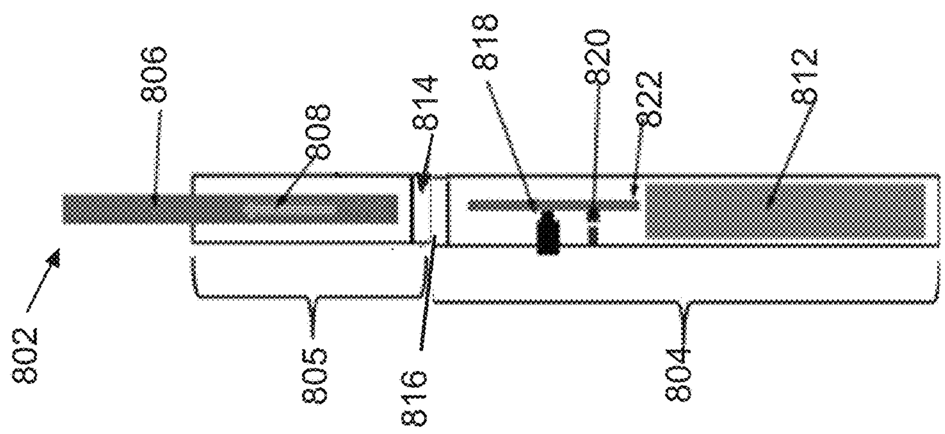
FIG. 8A is a cross-sectional perspective view of an assembled electronic smoking article, according to yet another example embodiment.

Referring to FIG. 8A, a perspective view of an assembled THS electronic smoking article 802 is shown, according to another example embodiment. The THS electronic smoking article 802 is similar to the electronic smoking article 202 of FIGS. 2A-2C. A difference between the THS electronic smoking article 802 and the electronic smoking article 202 is the use of a tobacco stick 806 on the mouth end of the heating element 805. The THS electronic smoking article 802 includes a battery compartment 804, a heating element 805, and a cylindrical tobacco stick 806 containing tobacco or other smoking material. The airflow 808 may be drawn from the battery compartment 804, such that the user breathes into or draws air through the battery compartment 804, through the heating element 805 to the tobacco stick 806, and, ultimately the mouth end to the user. In some embodiments, the airflow 808 may enter from the side of the battery compartment 804, for example, at a location on or adjacent the connector 814 of the heating element 805.

The battery compartment 804 includes a battery 812, a circuit board 822, an LED indicator 820, and an activation switch 818. The circuit board 822 is powered by the battery 812 and is operably connected to the LED indicator 820, the activation switch 818, and the heating element 805. The circuit board 822 is configured to control the operation of the THS electronic smoking article 802, including the activation, temperature control, and deactivation of the heating element 805. The activation switch 818 is operably connected to the circuit board 822 and allows the user to control the use (e.g., heating) of the THS electronic smoking article 802. In one embodiment, inhalation to draw in air starts the heating process. Alternatively, activation of a circuit closure (mechanical or optical) starts the heating process. As noted previously, the product generated by the THS electronic smoking article 802 is not a smoke, but rather an aerosol or a vapor resulting from the heating of tobacco in the tobacco stick 806. For example, inhalable substances can be substantially in the form of an aerosol (i.e., a suspension of fine solid particles or liquid droplets in a gas). In some embodiments, the THS electronic smoking article 802 has an LED indicator 820 on the battery compartment 804. The LED indicator end will indicate when the THS electronic smoking article 802 is working. The battery compartment 804 is removably coupled to the heating element 805 via complementary torsion (e.g., twist) interfaces on a connector end 816 of the battery compartment 804 and a connector end 814 of the heating element 805. As will be appreciated, a user of the THS electronic smoking article 802 can twist off the battery compartment 804 from heating element 805 to replace either component, to charge the battery compartment 804, for maintenance purposes, or similar actions.

The tobacco stick 806 is inserted into the heating element 805 such that the heating element surrounds the tobacco stick 806. In some embodiments, the heating element 805 protrudes into the tobacco stick 806 and heats the tobacco from the inside. A mouth end on the tobacco stick 806 allows for the user to breathe into or draw from the THS electronic smoking article 802, drawing in air that flows 808 through the battery compartment 804 to the tobacco stick 806, and, ultimately the mouth end to the user.

FIG. 8B illustrates a perspective view of an unassembled PUB-THS instrument 810 and the THS electronic smoking article 802 of FIG. 8A. The PUB-THS instrument 810 is similar to the PUB-THS instrument 610 such that the internal structure (e.g., controller, sensory array, etc.) PUB-THS instrument 810 is similar or identical in form and/or function to the PUB-THS instrument 610. A difference between the PUB-THS instrument 810 and the PUB-THS instrument 610 is the shape of the housing of the PUB-THS instrument 810, having two coupling elements, and the connection location of the PUB-THS instrument 810 between the battery compartment 804 and heating element 805 of the THS electronic smoking article.

The PUB-THS instrument 810 includes a first end connector 826 structured for torsional interface with the battery connector end 816 of the THS electronic smoking article 802. The PUB-THS instrument 810 further includes a second end connector 824 structured for torsional (e.g., twist) interface with the heating element connector end 814 of the THS electronic smoking article 802. As will be appreciated, the PUB-THS instrument 810 may include one or more of the components (e.g., controller, sensor array, etc.) described above. Alternative complementary interlocking interfaces on the first end connector 826 and the second end connector 824 may be used to interface with the appropriate interface on the THS electronic smoking article 802, for example, torsional-fit, press-fit, friction-fit, overlap lock-fit, or similar connective interfaces. While only one PUB-THS instrument 810 is shown in FIG. 8B, in some embodiments, one or more PUB-THS instruments 810 (e.g., modules) may be used in the THS electronic smoking article 802. In those embodiments, the first end connector 826, the second end connector 824, or both ends may be structured to couple with another PUB-THS instrument 810. In some embodiments, the housing of the PUB-THS instrument 810 is altered to better fit the form of the THS electronic smoking article 802.

Turning to FIG. 8C, a perspective view of the assembled THS electronic smoking article 802 with a PUB-THS instrument 810 (the combination referred herein as the "PUB-THS delivery system" 800) of FIG. 8B is shown, according to an example embodiment. The PUB-THS delivery system 800 has the same general form and structure of the original THS electronic smoking article 802. The PUB-THS instrument 810 has a size and form that is structured to minimally interfere physically with the intended form of the THS electronic smoking article 802. The components of the PUB-THS instrument 810 ensure that the performance and use of the PUB-THS delivery system 800 is substantially similar to the performance and use of the THS electronic smoking article 802.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples). Further, while multiple embodiments describe various dimensions and connections of the PUB instrument or PUB-THS instrument, it is anticipated that the PUB instrument or PUB-THS instrument may have a connection cross-section of a wide variety of target shapes and sizes.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

The computer readable program code (e.g., identification code) embodied on a processing circuit may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

What is claimed is:

1. A product use and behavior instrument comprising:

a housing defining a central compartment therein and an airway port that allows airflow through the product use and behavior instrument; and a controller positioned within the central compartment of the housing, the controller comprising:

a connector configured to operatively and removably couple the product use and behavior instrument to an electronic smoking article comprising a battery and an aerosol generating element to generate an aerosol from a tobacco product, the connector operatively and removably coupled to the battery of the electronic smoking article;

a sensor circuit structured to collect at least one use data characteristic of a smoking action;

local memory structured to store the at least one use data characteristic of the smoking action; and a communication interface structured to communicate the stored at least one use data characteristic of the smoking action to a remote computing device, wherein the sensor circuit begins capturing the at least one use data characteristic of the smoking action in response to detection of a change in ambient temperature within the product use and behavior instrument.

2. The product use and behavior instrument of claim 1, wherein the at least one use data characteristic includes a first use data characteristic of the smoking action, wherein the sensor circuit is structured to collect a the first use data characteristic of a the smoking action, the first use data characteristic comprising a frequency of a sound of air passing through the airway port, the frequency of the sound of air passing through the airway port being used to determine a second use data characteristic of the smoking action, the second use data characteristic comprising a puff velocity, wherein the local memory is structured to store the first use data characteristic of the smoking action and the second use data characteristic of the smoking action, and wherein the communication interface is structured to communicate the stored first use data characteristic of the smoking action and the stored second use data characteristic of the smoking action to the remote computing device.

3. The product use and behavior instrument of claim 2, wherein the communication interface is structured to communicate at least one of the first use data characteristic of the smoking action or the second use data characteristic of the smoking action stored in the local memory to a receiving computing system when the product use and behavior instrument is within range of the receiving computing system.

4. The product use and behavior instrument of claim 2, wherein the connector is configured to operatively and removably couple the product use and behavior instrument to the electronic smoking article that is operable to generate the aerosol from the tobacco product whether or not the product use and behavior instrument is coupled to the electronic smoking article.

5. The product use and behavior instrument of claim 1, wherein the sensor circuit includes a pressure sensor to measure changes in air pressure or flow through the airway port.

6. The product use and behavior instrument of claim 1, wherein the connector is a first connector operatively and removably coupled to the battery of the electronic smoking article, and further comprising a second connector, the second connector configured to operatively and removably couple the product use and behavior instrument to the aerosol generating element of the electronic smoking article.

7. The product use and behavior instrument of claim 1, wherein the connector comprises a press coupling member.

8. The product use and behavior instrument of claim 1, wherein the at least one use data characteristic includes a first use data characteristic of a smoking action, and wherein the first use data characteristic of the smoking action includes an activity component and a time component.

9. The product use and behavior instrument of claim 8, wherein the activity component comprises at least one of puff number, puff duration, or inter- puff interval, and wherein the time component comprises at least one of activity time, activity duration, or activity period.

10. The product use and behavior instrument of claim 8, wherein the activity component comprises at least one of battery current, battery voltage, battery resistance, orientation, temperature of air flow, or air flow pressure, and wherein the time component comprises at least one of activity time, activity duration, or activity period.

11. The product use and behavior instrument of claim 1, wherein the controller further comprises a location sensor circuit, the location sensor circuit structured to provide information regarding positioning and orientation during the smoking action.

12. The product use and behavior instrument of claim 1, wherein the controller further comprises a biometric sensor, the biometric sensor structured to capture a biometric from an authorized user, and wherein the first at least one use data characteristic of the smoking action is captured only if the authorized user is detected.

13. The product use and behavior instrument of claim 1, wherein the controller further comprises a toggle button, the toggle button structured to alter operation of at least one of the sensor circuit, the local memory, or the communication interface.

14. The product use and behavior instrument of claim 1, wherein the at least one use data characteristic of the smoking action includes an identifier, the identifier including at least one of a clinical data type, a non-clinical data type, or a user identifier.

15. The product use and behavior instrument of claim 1, wherein the at least one use data characteristic of the smoking action includes a tobacco product identifier, the tobacco product identifier indicative of a characteristic of the tobacco product used in the electronic smoking article.

16. The product use and behavior instrument of claim 1, further comprising a rechargeable solid state battery.

17. An electronic smoking article, comprising:

an aerosol generating element configured to generate an aerosol from a tobacco product;

a battery; and a product use and behavior instrument comprising:

an airway port that allows airflow through the product use and behavior instrument; and a controller comprising:

a connector configured to operatively and removably couple the product use and behavior instrument to the electronic smoking article, the connector operatively and removably coupled to the battery of the electronic smoking article, the connector having an airflow cavity that allows airflow through the product use and behavior instrument to the electronic smoking article;

a sensor circuit structured to collect at least one use data characteristic of a smoking action;

local memory structured to store the at least one use data characteristic of the smoking action; and a communication interface structured to communicate the stored at least one use data characteristic of the smoking action to a remote computing device, wherein the sensor circuit begins capturing the at least one use data characteristic of the smoking action in response to detection of a change in ambient temperature within the product use and behavior instrument.

18. The electronic smoking article of claim 17, wherein the at least one use data characteristic includes a first use data characteristic of the smoking action, wherein the sensor circuit is structured to collect a the first use data characteristic of the smoking action, the first use data characteristic comprising a frequency of a sound of air passing through the airway port, the frequency of the sound of air passing through the airway port being used to determine a second use data characteristic of the smoking action, the second use data characteristic comprising a puff velocity, wherein the local memory is structured to store the first use data characteristic of the smoking action and the second use data characteristic of the smoking action, and wherein the communication interface is structured to communicate the stored first use data characteristic of the smoking action and the stored second use data characteristic, of the smoking action to the remote computing device.

19. The electronic smoking article of claim 17, wherein the sensor circuit includes a pressure sensor to measure changes in air pressure or flow through the airway port.

20. The electronic smoking article of claim 17, wherein the connector is a first connector operatively and removably coupled to the battery of the electronic smoking article, further comprising a second connector, the second connector configured to operatively and removably couple the product use and behavior instrument to the aerosol generating element of the electronic smoking article.

21. The electronic smoking article of claim 17, wherein the connector comprises a torsion coupling member.

22. The electronic smoking article of claim 17, wherein the connector comprises a press fit coupling member.

23. The electronic smoking article of claim 17, wherein the controller further comprises a location sensor circuit, the location sensor circuit structured to provide information regarding positioning and orientation during use of the electronic smoking article.

24. The electronic smoking article of claim 17, wherein the controller further comprises a fingerprint sensor, the fingerprint sensor structured to capture a fingerprint from an authorized user, and wherein the at least one use data characteristic of the smoking action is captured only if the authorized user is detected.

25. The electronic smoking article of claim 17, wherein the at least one use data characteristic of the smoking action includes an activity component and a time component.

26. The electronic smoking article of claim 25, wherein the activity component comprises at least one of puff number, puff duration, or inter-puff interval, and wherein the time component comprises at least one of activity time, activity duration, or activity period.

27. A product use and behavior instrument comprising:

a housing defining a central compartment therein and an airway port that allows airflow through the product use and behavior instrument; and a controller positioned within the central compartment of the housing, the controller comprising:

a connector configured to operatively and removably couple the product use and behavior instrument to an electronic smoking article comprising a battery and a heating element to heat a tobacco product, wherein the tobacco product is a tobacco stick positioned proximate the heating element such that the heating element is capable of heating a portion of the tobacco stick to generate an aerosol, the tobacco stick protruding away from the battery and comprising a mouth end, and wherein the connector is operatively and removably coupled to the heating element, the housing being formed around the tobacco stick such that mouth end is accessible by a user of the electronic smoking article;

a sensor circuit structured to collect at least one use data characteristic of a smoking action, wherein the smoking action is associated with the use of at least one of the heating element or the battery; and a communication interface structured to communicate the first-at least one use data characteristic of the smoking action to a remote computing device;

wherein the sensor circuit begins capturing the at least one use data characteristic of the smoking action in response to detection of a change in ambient temperature within the product use and behavior instrument.

28. The product use and behavior instrument of claim 27, wherein the tobacco stick is inserted into the heating element, the tobacco stick protruding away from the battery and comprising a mouth end, and wherein the connector is operatively and removably coupled to the heating element, the housing being formed around the tobacco stick such that mouth end is accessible by a user of the electronic smoking article.

29. The product use and behavior instrument of claim 27, wherein the at least one use data characteristic includes a first use data characteristic of the smoking action, and wherein the sensor circuit is structured to collect the first use data characteristic of the smoking action, the first use data characteristic comprising a frequency of a sound of air passing through the airway port, the frequency of the sound of air passing through the airway port being used to determine a second use data characteristic of the smoking action, the second use data characteristic comprising a puff velocity, and wherein the communication interface is structured to communicate the first use data characteristic of the smoking action and the second use data characteristic of the smoking action to the remote computing device.

30. An electronic smoking article, comprising:

a heating element configured to heat a tobacco product;

a battery; and a product use and behavior instrument comprising:

a housing defining an airway port that allows airflow through the product use and behavior instrument; and a controller comprising:

a connector configured to operatively and removably couple the product use and behavior instrument to the electronic smoking article, wherein the tobacco product is a tobacco stick positioned proximate the heating element such that the heating element is capable of heating a portion of the tobacco stick to generate an aerosol, the tobacco stick protruding away from the battery and comprising a mouth end, and wherein the connector is operatively and removably coupled to the heating element, the housing being formed around the tobacco stick such that mouth end is accessible by a user of the electronic smoking article;

a sensor circuit structured to collect at least one use data characteristic of a smoking action, wherein the smoking action is associated with the use of at least one of the heating element or the battery;

local memory structured to store the at least one use data characteristic of the smoking action; and a communication interface structured to communicate the stored at least one use data characteristic of the smoking action to a remote computing device;

wherein the sensor circuit begins capturing the at least one use data characteristic of the smoking action in response to detection of a change in ambient temperature within the product use and behavior instrument.

31. The electronic smoking article of claim 30, wherein the tobacco stick is inserted into the heating element, the tobacco stick protruding away from the battery and comprising a mouth end, and wherein the connector is operatively and removably coupled to the heating element, the product use and behavior instrument being formed around the tobacco stick such that mouth end is accessible by a user of the electronic smoking article.

32. The electronic smoking article of claim 30, wherein the at least one use data characteristic includes a first use data characteristic of the smoking action, and wherein the sensor circuit structured to collect the first use data characteristic of the smoking action, the first use data characteristic comprising a frequency of a sound of air passing through the airway port, the frequency of the sound of air passing through the airway port being used to determine a second use data characteristic of the smoking action, the second use data characteristic comprising a puff velocity, and wherein the local memory is structured to store the first use data characteristic of the smoking action and the second use data characteristic of the smoking action, and the communication interface is structured to communicate the stored first use data characteristic of the smoking action and the stored second use data characteristic of the smoking action to the remote computing device.

33. A method for capturing at least one use data characteristic of a smoking action, comprising:

providing an electronic smoking article to a user, the electronic smoking article comprising:

an aerosol generating element configured to generate an aerosol from a tobacco product;

a battery; and a product use and behavior instrument comprising:

an airway port that allows airflow through the product use and behavior instrument; and a controller comprising:

a connector configured to operatively and removably couple the product use and behavior instrument to the electronic smoking article, the connector operatively and removably coupled to the battery of the electronic smoking article, the connector having an airflow cavity that allows airflow through the product use and behavior instrument to the electronic smoking article;

a sensor circuit structured to collect the at least one use data characteristic of a smoking action;

local memory structured to store the at least one use data characteristic of the smoking action; and a communication interface structured to communicate the stored at least one use data characteristic of the smoking action to a remote computing device;

activating the sensor circuit by the controller in response to initiation of the smoking action;

capturing the at least one use data characteristic of the smoking action with the sensor circuit, wherein the sensor circuit begins capturing the at least one use data characteristic of the smoking action in response to detection of a change in ambient temperature within the product use and behavior instrument; and storing the at least one use data characteristic of the smoking action in the local memory.

34. The method of claim 33, wherein the at least one use data characteristic includes a first use data characteristic of the smoking action, wherein the sensor circuit is structured to collect the first use data characteristic of the smoking action, the first use data characteristic comprising a frequency of a sound of air passing through the airway port of the product use and behavior instrument, the frequency of the sound of air passing through the airway port being used to determine a second use data characteristic of the smoking action, the second use data characteristic comprising a puff velocity, wherein the local memory is structured to store the first use data characteristic of the smoking action and the second use data characteristic of the smoking action;, and wherein the communication interface is structured to communicate the stored first use data characteristic of the smoking action and the stored second use data characteristic, of the smoking action to the remote computing device, capturing at least one of the first use data characteristic of the smoking action or the second use data characteristic of the smoking action with the sensor circuit; and storing at least one of the first use data characteristic of the smoking action or the second use data characteristic of the smoking action in the local memory.

35. The method of claim 33, further comprising transmitting the at least one use data characteristic stored in local memory to a receiving computing system via the communications interface.

* * * * *

UNITED STATES PATENT AND TRADEMARK OFFICE
CERTIFICATE OF CORRECTION

PATENT NO. : 12,326,794 B2
APPLICATION NO. : 15/892151
DATED : June 10, 2025
INVENTOR(S) : Jeffrey Sean Smith et al.

Page 1 of 1

It is certified that error appears in the above-identified patent and that said Letters Patent is hereby corrected as shown below:

In the Claims

Column 33, Claim 2, Line 21, "a the first" should read --the first use--

Column 34, Claim 12, Line 23, "and wherein the first at least one" should read --and wherein the at least one--

Column 35, Claim 18, Line 7, "a the first use data" should read --the first use data--

Column 36, Claim 27, Line 15, "first-at least one use data" should read --at least one use data--

Signed and Sealed this
Twenty-eighth Day of October, 2025

John A. Squires
*Director of the United States Patent and Trademark Office*